United States Patent
Yang et al.

(10) Patent No.: US 10,555,192 B2
(45) Date of Patent: Feb. 4, 2020

(54) PREDICTING RECEIVED SIGNAL STRENGTH IN A TELECOMMUNICATION NETWORK USING DEEP NEURAL NETWORKS

(71) Applicant: Futurewei Technologies, Inc., Plano, TX (US)

(72) Inventors: Jin Yang, Bridgewater, NJ (US); Xin Zhang, Pennington, NJ (US); Jie Ren, Somerset, NJ (US); Ruilin Liu, Hillsborough, NJ (US); Xufeng Chen, Shanghai (CN); Xie Wang, Shanghai (CN); Qitao Song, Shanghai (CN); Lizhou Zhou, Shenzhen (CN); Xiujun Shu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 79 days.

(21) Appl. No.: 15/814,074

(22) Filed: Nov. 15, 2017

(65) Prior Publication Data

US 2019/0150006 A1    May 16, 2019

(51) Int. Cl.
*H04W 24/06*  (2009.01)
*G06N 3/02*  (2006.01)
*H04W 48/04*  (2009.01)

(52) U.S. Cl.
CPC ............. *H04W 24/06* (2013.01); *G06N 3/02* (2013.01); *H04W 48/04* (2013.01)

(58) Field of Classification Search
CPC .. H04B 17/318; H04B 17/27; H04B 17/3913; H04W 16/18; H04W 64/00

(Continued)

(56) References Cited

U.S. PATENT DOCUMENTS

| 2016/0242192 A1 | 8/2016 | Llosa et al. |
| 2017/0280332 A1* | 9/2017 | Chatelain ............. H04W 16/18 |
| 2019/0019050 A1* | 1/2019 | Roblek .................... G06T 7/11 |

FOREIGN PATENT DOCUMENTS

| CN | 102088319 A | 6/2011 |
| CN | 106792769 A | 5/2017 |

OTHER PUBLICATIONS

Piacentini and Rinaldi, "Path Loss Prediction in Urban Environment Using Learning Machines and Dimensionality Reduction Techniques," Dipartimento Di Informatica e Sistemistca Antonio Ruberti, Technical Report n. 11, 2009, 14 pages.

(Continued)

*Primary Examiner* — Sam Bhattacharya
(74) *Attorney, Agent, or Firm* — Fish & Richardson P.C.

(57) ABSTRACT

A computer-implemented method for predicting received signal strength in a telecommunication network includes receiving, by one or more processors that execute a convolutional neural network, geographic data representing geographic information of a geographic area and antenna and transmit power information of a base station in the geographic area; inputting the geographic data and the antenna and transmit power information into the convolutional neural network; predicting received signal strength using the convolutional neural network that includes a number of convolution layers based on the received geographic data and the antenna and transmit power information, the received signal strength representing signal strength of wireless signals received at different locations in the geographic area; and outputting the predicted received signal strength.

20 Claims, 15 Drawing Sheets

GIS map patch of site

Deep convolutional neural network (ConvNet)

Received signal strength matrix

(58) Field of Classification Search
USPC .................. 455/67.11, 422.1, 423, 456.1
See application file for complete search history.

(56) References Cited

OTHER PUBLICATIONS

Sotiroudis et al., "Application of a Composite Differential Evolution Algorithm in Optimal Neural Network Design for Propagation Path-Loss Prediction in Mobile Communication Systems," IEEE Antennas and Wireless propagation Letters, 2013, 4 pages.

Sotiroudis et al., "Optimal Artificial Neural Network Design for Propagation Path-Loss Predicition using Adaptive Evolutionary Algorithms," 2013 7th European Conference on Antennas and Propagation (EuCAP), 2013, 5 pages.

Mom et al., "Application of Artificial Neural Network for Path Loss Prediction in Urban Macrocellular Environment," American Journal of Engineering Research (AJER), 2014, 6 pages.

Sotiroudis and Siakavara, "Mobile Radio Propagation Path Loss Prediction using Artificial Neural Networks with Optimal Input Information for Urban Environments," Int. J. Electron. Commun. (AEU) 1453-1463, 2015, 11 pages.

Mgbe et al., "Performance Evaluation of Generalized Regression Neural Network Path Loss Prediction Model in Macrocellular Environment," Journal of Multidisciplinary Engineering Science and Technology (JMEST), vol. 2, Issue 2, Feb. 2015, 5 pages.

Chang and Yang, "Environment-Adaptation Mobile Radio Propagation Prediction using Radial Basis Function Neural Networks," IEEE Transactions on Vehicular Technology, vol. 46, No. 1, Feb. 1997, 6 pages.

Popescu et al., "Applications of Generalized RBF-NN for Path Loss Prediction," PIMRC 2002, IEEE, 5 pages.

Sotiroudis et al., "A Neural Network Approach to the Prediction of the Propagation Path-Loss for Mobile Communications Systems in Urban Environments," PIERS Proceedings, Prague, Czech Republic, Aug. 27-30, 2007, 5 pages.

Erbay Dalkilic et al., "Fuzzy Adaptive Neural Network Approach to Path Loss Prediction in Urban Areas at GSM-900 Band," Turk. J. Eng. and Comp. Sci., vol. 18, No. 6, 2010, 18 pages.

Ostlin et al., "Macrocell Path Loss Prediction using Artificial Neural Networks," IEEE, 2010, 14 pages.

International Search Report and Written Opinion issued in International Application No. PCT/CN2018/116485 dated Feb. 13, 2019, 9 pages.

\* cited by examiner

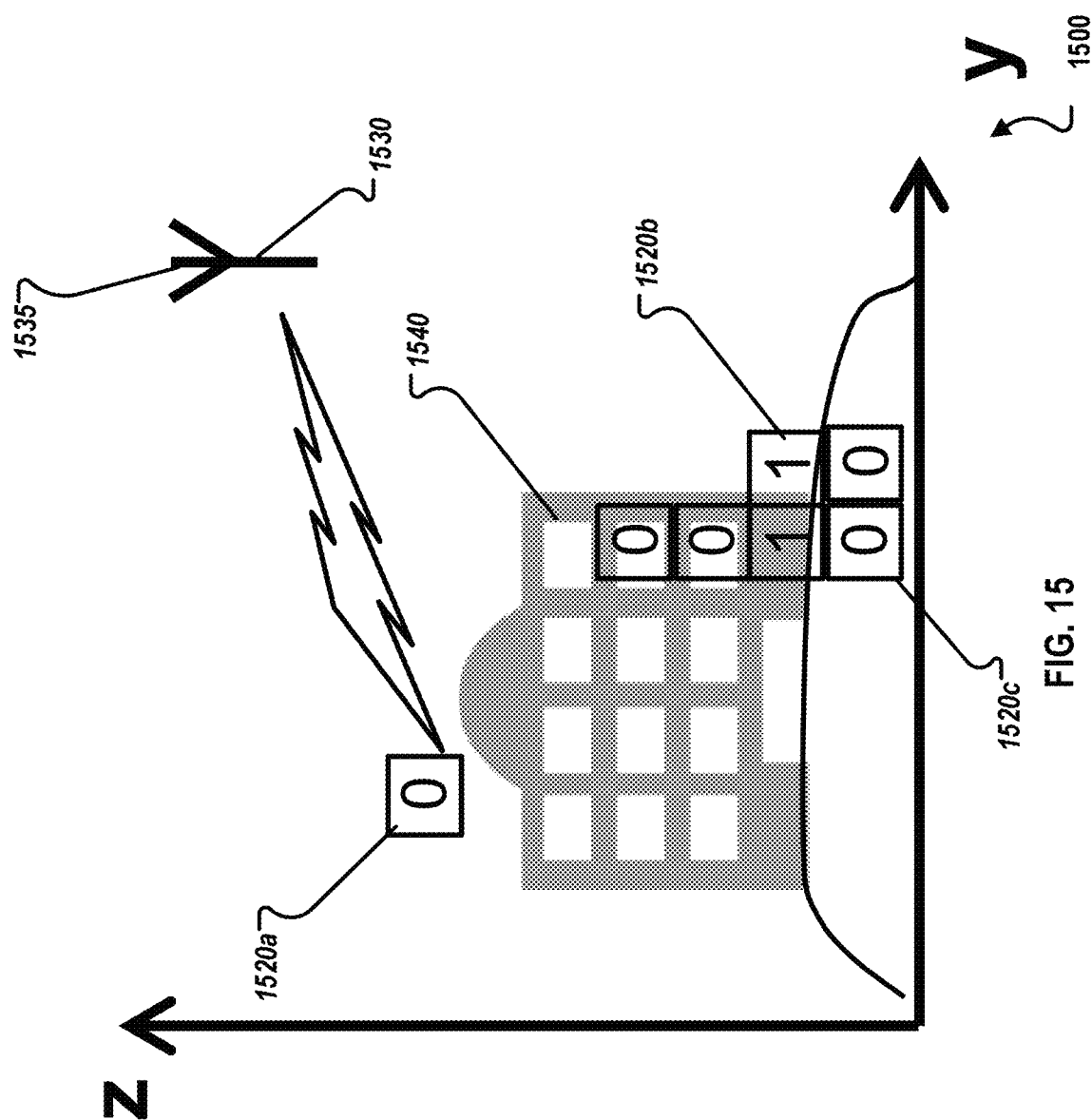

PREDICTING RECEIVED SIGNAL STRENGTH IN A TELECOMMUNICATION NETWORK USING DEEP NEURAL NETWORKS

TECHNICAL FIELD

This disclosure relates to predicting received signal strength in a telecommunication network using a deep neural network.

BACKGROUND

In a wireless communication system, a wireless signal (e.g., in a form of an electromagnetic wave) transmitted by a transmitter can undergo attenuation as it propagates through space. For example, a receiver (e.g., a mobile device) can receive a wireless signal transmitted by a transmitter (e.g., a base station). The difference in the signal strength (e.g., in terms of power or energy) between the transmitted wireless signal and the received wireless signal strength can be referred to as path loss, which represents the reduction in power density (attenuation) of an electromagnetic wave as it propagates through space. Path loss can be used in analysis and design of a link budget of a telecommunication system.

Path loss may be due to many effects, such as, free-space loss, refraction, diffraction, reflection, aperture-medium coupling loss, and absorption. Path loss can be influenced by terrain contours, environment (e.g., urban or rural, vegetation or foliage, and the like), propagation medium (e.g., dry or moist air), the distance between the transmitter and the receiver, the height and location of antennas, and other factors.

As such, for a same transmitted wireless signal, the received signal strength can be different depending on the locations of the receivers as the transmitted signal can undergo different path losses before reaching the receivers. The received signal strength can be measured or calculated. The path loss can be calculated, for example, as a difference between the received signal strength and the transmitted signal strength.

Calculation of the received signal strength and/or path loss can be typically referred to as prediction, without requiring actually transmitting the wireless signal. In practice, calculation of the received signal strength and/or path loss typically involves approximations. For example, the received signal strength and/or path loss can be predicted using statistical methods and deterministic methods. Statistical methods (also referred to as empirical methods) are based on measured and averaged received signal strength and/or path losses along typical classes of radio links. Deterministic methods are based on physical laws of wave propagation. Ray tracing is an example of the deterministic method. There are commercial tools for received signal strength and/or path loss prediction, such as VOLCANO software by SIRADEL.

SUMMARY

The present disclosure describes a system and method for predicting received signal strength in a telecommunication network using a deep neural network.

In a first implementation, a computer-implemented method predicting received signal strength in a telecommunication network includes receiving, by one or more processors that execute a convolutional neural network, geographic data representing geographic information of a geographic area and antenna and transmit power information of a base station in the geographic area; inputting the geographic data and the antenna and transmit power information into the convolutional neural network; predicting received signal strength using the convolutional neural network that includes a number of convolution layers based on the received geographic data and the antenna and transmit power information, the received signal strength representing signal strength of wireless signals received at different locations in the geographic area; and outputting the predicted received signal strength.

In a second implementation, a non-transitory computer-readable media storing computer instructions for predicting received signal strength in a telecommunication network, that when executed by one or more processors, cause the one or more processors to perform the steps of: receiving, by one or more processors that execute a convolutional neural network, geographic data representing geographic information of a geographic area and antenna and transmit power information of a base station in the geographic area; inputting the geographic data and the antenna and transmit power information into the convolutional neural network; predicting received signal strength using the convolutional neural network that includes a number of convolution layers based on the received geographic data and the antenna and transmit power information, the received signal strength representing signal strength of wireless signals received at different locations in the geographic area; and outputting the predicted received signal strength.

In a third implementation, a received signal strength prediction device, including: a non-transitory memory storage including instructions; and one or more processors in communication with the memory, wherein the one or more processors execute a convolutional neural network that includes a number of convolution layers and execute the instructions to: receive geographic data representing geographic information of a geographic area and antenna and transmit power information of a base station in the geographic area; input the geographic data and the antenna and transmit power information into the convolutional neural network; predict received signal strength using the convolutional neural network that comprises a plurality of convolution layers based on the received geographic data and the antenna and transmit power information, the received signal strength representing signal strength of wireless signals received at different locations in the geographic area; and output the predicted received signal strength.

The foregoing and other described implementations can each, optionally, include one or more of the following features.

A first feature, combinable with any of the following features, wherein the convolutional neural network has a cross-layer structure in that the predicted received signal strength corresponding to the different locations of the geographic area are determined by combining outputs of two or more layers at different depths of the convolutional neural network.

A second feature, combinable with any of the previous or following features, wherein combining outputs of two or more layers at different depths of the convolutional neural network includes using the outputs of the two or more layers as input to one or more additional neural network layers to generate one or more outputs.

A third feature, combinable with any of the previous or following features, further including performing a site planning of the geographic area based on the predicted received signal strength.

A fourth feature, combinable with any of the previous or following features, wherein the geographic data includes geographic information system (GIS) data that includes one or more of a building height map layer, a terrain layer, or a clutter layer.

A fifth feature, combinable with any of the previous or following features, wherein wherein the geographic data includes one or more of a satellite picture or an aviation picture.

A sixth feature, combinable with any of the previous or following features, wherein the convolutional neural network is trained by using both simulated path loss data and actual path loss data.

A seventh feature, combinable with any of the previous or following features, wherein the antenna and transmit power information of the base station in the geographic area comprise free-space received signal strength representing free-space received signal strength of wireless signals received at different locations in the geographic area, wherein the free-space received signal strength the different locations in the geographic area are calculated based on a transmission power of the antenna, a radiation pattern of the antenna, and respective distances from the different locations in the geographic area to the antenna of the base station.

An eighth feature, combinable with any of the previous or following features, further including determining a multi-dimensional tensor based on the geographic data and the antenna and power information of the base station, wherein the multi-dimensional tensor comprises one or more of: a free-space received signal strength tensor, a horizontal line of sight angle tensor, a vertical line of sight angle tensor, a permittivity tensor, or a user equipment (UE) location tensor; and wherein predicting the received signal strength based on the received geographic data includes predicting the received signal strength based on the multi-dimensional tensor.

A ninth feature, combinable with any of the previous or following features, further including calculating path loss values corresponding to the predicted received signal strength, the predicted path loss values representing propagation attenuation of the wireless signals at the different locations in the geographic area.

In a fourth implementation, a computer-implemented method for training a convolutional neural network for predicting received signal strength in a telecommunication network, including: receiving, by one or more processors that execute a convolutional neural network that includes a first number of convolution layers, first geographic data representing geographic information of a first geographic area and first antenna and transmit power information of a first base station in the first geographic area; receiving, by the one or more processors that execute the convolutional neural network, actual received signal strength, the actual received signal strength representing measured signal strength of wireless signals received at different locations in the first geographic area; training, by the one or more processors that execute the convolutional neural network, the convolutional neural network using the first geographic data, the first antenna and transmit power information of the first base station in the first geographic area, and the actual received signal strength for predicting received signal strength representing signal strength of wireless signals received at different locations in a third geographic area; and obtaining, by the one or more processors that execute the convolutional neural network, a trained convolutional neural network that includes a second number of convolution layers.

In a fifth implementation, a non-transitory computer-readable media storing computer instructions for training a convolutional neural network for predicting received signal strength in a telecommunication network, that when executed by one or more processors, cause the one or more processors to perform the steps of: receiving, by one or more processors that execute a convolutional neural network that includes a first number of convolution layers, first geographic data representing geographic information of a first geographic area and first antenna and transmit power information of a first base station in the first geographic area; receiving, by the one or more processors that execute the convolutional neural network, actual received signal strength, the actual received signal strength representing measured signal strength of wireless signals received at different locations in the first geographic area; training, by the one or more processors that execute the convolutional neural network, the convolutional neural network using the first geographic data, the first antenna and transmit power information of the first base station in the first geographic area, and the actual received signal strength for predicting received signal strength representing signal strength of wireless signals received at different locations in a third geographic area; and obtaining, by the one or more processors that execute the convolutional neural network, a trained convolutional neural network that includes a second number of convolution layers.

In a sixth implementation, a device for training a convolutional neural network for predicting received signal strength in a telecommunication network, including: a non-transitory memory storage including instructions; and one or more processors in communication with the memory, wherein the one or more processors execute the instructions to: receive, by one or more processors that execute a convolutional neural network that includes a first number of convolution layers, first geographic data representing geographic information of a first geographic area and first antenna and transmit power information of a first base station in the first geographic area; receive, by the one or more processors that execute the convolutional neural network, actual received signal strength, the actual received signal strength representing measured signal strength of wireless signals received at different locations in the first geographic area; train, by the one or more processors that execute the convolutional neural network, the convolutional neural network using the first geographic data, the first antenna and transmit power information of the first base station in the first geographic area, and the actual received signal strength for predicting received signal strength representing signal strength of wireless signals received at different locations in a third geographic area; and obtain, by the one or more processors that execute the convolutional neural network, a trained convolutional neural network that includes a second number of convolution layers.

The foregoing and other described implementations can each, optionally, include one or more of the following features.

A first feature, combinable with any of the following features, further including: receiving, by the one or more processors that execute the convolutional neural network, second geographic data representing geographic information of a second geographic area and second antenna and transmit power information of a second base station in the second geographic area; receiving, by the one or more processors that execute the convolutional neural network, simulated received signal strength, the simulated received signal strength representing simulated signal strength of wireless signals received at different locations in the second geographic area; and wherein training the convolutional neural network using the first geographic data, the first antenna and transmit power information of the first base station in the first geographic area, and the actual received signal strength includes training the convolutional neural network using the first geographic data and the actual received signal strength, and the second geographic data, the second antenna and transmit power information of a second base station in the second geographic area, and the simulated received signal strength.

A second feature, combinable with any of the previous or following features, wherein receiving the simulated received signal strength includes receiving the simulated received signal strength from a simulator that estimates received signal strength representing signal strength of wireless signals received at different locations in the second geographic area.

A third feature, combinable with any of the previous or following features, wherein training the convolutional neural network includes: obtaining a first trained convolutional neural network by training the convolutional neural network based on the second geographic data, the second antenna and transmit power information of a second base station in the second geographic area, and the simulated received signal strength; and fine tuning the first convolutional neural network based on the first geographic data, the first antenna and transmit power information of the first base station in the first geographic area, and the actual received signal strength.

A fourth feature, combinable with any of the previous or following features, wherein receiving actual received signal strength includes receiving the actual received signal strength based on a road test that measures received signal strength representing signal strength of wireless signals received at different locations in the first geographic area.

A fifth feature, combinable with any of the previous or following features, wherein the trained convolutional neural network has a cross-layer structure in that received signal strength output from the trained convolutional neural network are obtained by combining outputs of two or more layers at different depths of the trained convolutional neural network.

A sixth feature, combinable with any of the previous or following features, further including using the trained convolutional neural network for predicting the received signal strength representing signal strength of wireless signals received at different locations in the third geographic area.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 15 is a schematic diagram illustrating examples user equipment (UE) existence indicators of a UE location tensor at different locations in a geographic area, according to an implementation.

Like reference numbers and designations in the various drawings indicate like elements.

DETAILED DESCRIPTION

Figure 1:
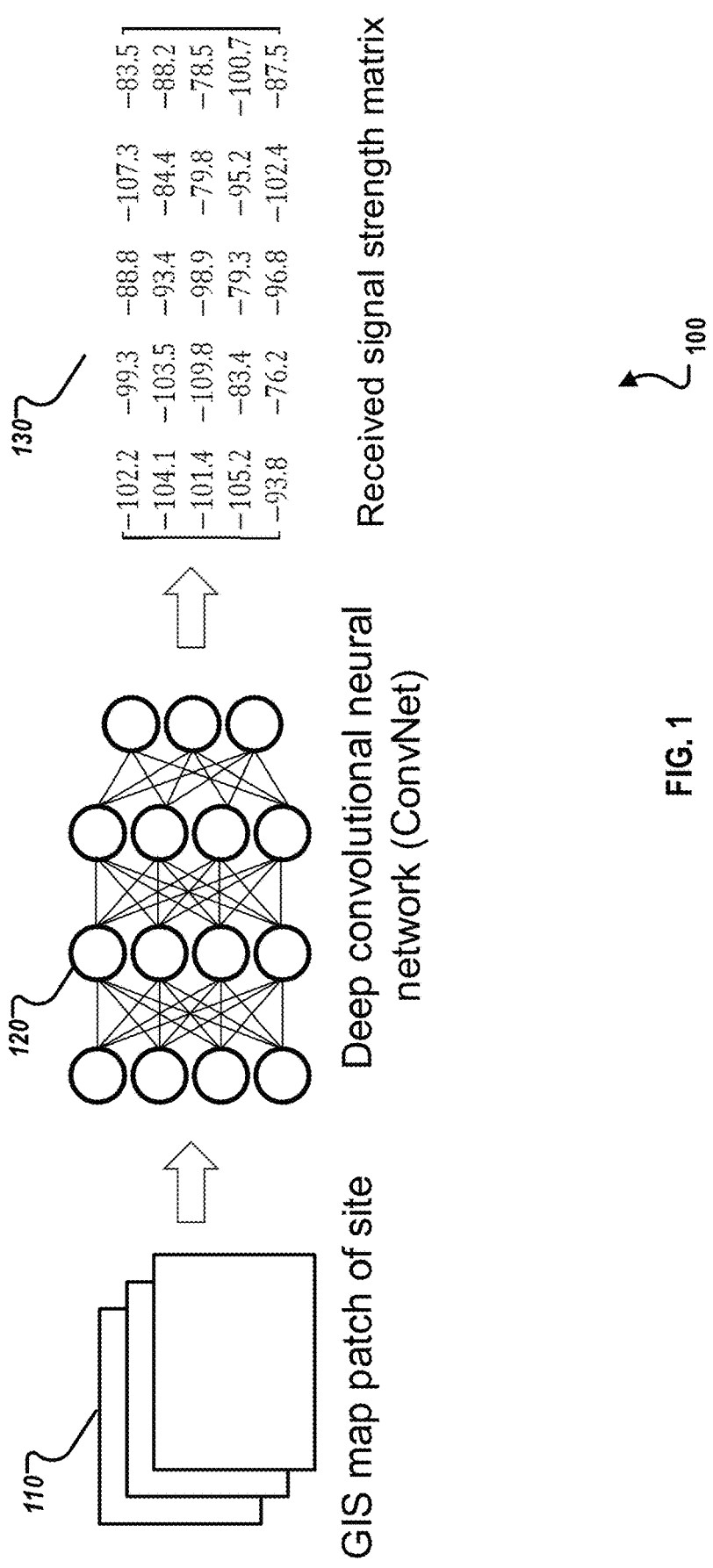
FIG. 1 is a schematic diagram illustrating an example process flow of predicting received signal strength using a deep neural network, according to an implementation.

The following detailed description describes predicting received signal strength in a telecommunication network using a deep neural network and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

In a telecommunication network, such as a wireless communication network, received signal strength and/or path loss information can be used in automatic site planning (ASP) to predict signal coverage. With information of a transmitted signal strength, a received signal strength and path loss can be derived from each other. For example, the received signal strength can equal the transmitted signal strength minus the path loss; while the path loss can equal the transmitted signal strength minus the received signal strength. The following detailed description focuses on techniques for predicting received signal strength. It will be apparent to those skilled in the art that the path loss can be predicted in a similar manner. Alternatively or additionally, given the received signal strength, the corresponding path loss can be readily obtained. As such, the received signal strength, the path loss, or both can be predicted based on the techniques disclosed in this disclosure.

In some implementations, rather than using statistical methods and deterministic methods, received signal strength can be predicted using a deep neural network. For example, a deep neural network can be used to process geographic information system (GIS) information and predict the signal loss from a base station of a site to each possible UE location in the site. In some implementations, predicting received signal strength can include calculating signal strength of wireless signals received at different locations (e.g., possible UE locations) in a geographic area (e.g., the site of interest), without actually transmitting the wireless signals. For example, for ASP, in order to determine a suitable location to place the base station in a geographic area, a candidate or hypothetical location of a base station in a geographic area can be selected. Geographic data (e.g., GIS maps) representing geographic information of the geographic area can be obtained. Antenna and transmit power information (e.g., power, energy, or other metrics) of the base station can be assumed or determined, for example, that includes or reflects transmit power of wireless signals transmitted from the base station at the candidate location. These types of information can be input into a deep neural network to predict received signal strength representing signal strength of wireless signals received at different locations (e.g., possible UE locations) in the geographic area. In some implementations, the above process for predicting received signal strength can be repeated for other candidate locations of the base station. The suitable location to place the base station can be determined based on the predicted received signal strength corresponding to different candidate locations of the base station. For example, the suitable location to place the base station can be the candidate location of the base station that gives rise to the highest average received signal strength at different locations, the minimum variance of the received signal strength at different locations, or meeting any other criteria.

A deep neural network is a type of an artificial neural network (also referred to as a neural network). A neural network can be modeled as collections of neurons that are connected in an acyclic graph. In other words, the outputs of some neurons can become inputs to other neurons. A neural network can be organized into distinct layers of neurons. For example, as a regular neural network, the most common layer type is the fully-connected layer in which neurons between two adjacent layers are fully pairwise connected, but neurons within a single layer share no connections. A neural network can define a family of functions that are parameterized by weights of the neurons of the neural network.

A deep neural network can include a convolutional neural network (also referred to as a ConvNet) that is a multi-layer artificial neural network. A ConvNet can include neurons that have learnable weights and biases. In some implementations, each neuron receives some inputs, performs a dot product, and optionally follows it with a non-linear function.

Unlike regular neural networks, ConvNet scale well with image inputs. In some implementations, an explicit assumption can be made for a ConvNet that the inputs are images, which allows building certain properties into the architecture of the ConvNet. These properties can then make forward functions more efficient to implement and vastly reduce the amount of parameters in the ConvNet. For example, unlike a regular neural network, the layers of a ConvNet have neurons arranged in three dimensions: width, height, and depth. (Note that the term "depth" here refers to the third dimension of an activation volume, not to the depth of a full neural network, which refers to the total number of layers in a neural network). In some implementations, the whole ConvNet can be used to express a single differentiable score function: from the raw image pixels of the input to class scores of the output.

As an example, the input images in CIFAR-10 (a common benchmark problem in machine learning to classify RGB 32×32 pixel images across 10 categories) are an input volume of activations, and the volume has dimensions 32×32×3 (width, height, and depth, respectively). In some implementations, the neurons in a layer will only be connected to a small region of the layer before it, instead of all of the neurons in a fully-connected manner. Moreover, the final output layer for CIFAR-10 would have dimensions 1×1×10, because by the end of the ConvNet architecture, the full image will be reduced into a single vector of class scores, arranged along the depth dimension.

A ConvNet can include a sequence of layers. In some implementations, every layer of a ConvNet transforms one volume of activations to another through a differentiable function. For example, a ConvNet can include a list of layers that transform an input image volume into an output volume (e.g. holding the class scores). In other words, a ConvNet can transform an original image layer by layer from the original pixel values of the original image to the final class scores.

In some implementations, a ConvNet can include different types of layers. Some example types of layers include a Convolution Layer (CONV layer), a Pooling Layer (POOL layer), a Rectified Linear Units layer (RELU layer), and a Fully-Connected Layer (FC layer). These layers can be stacked to form a full ConvNet architecture. In some implementations, a CONV layer can compute an output of neurons that are connected to local regions in the input, for example, by computing a dot product between their weights and a small region (called kernels or filters) that they are connected to in the input volume. In some implementations, a convolutional neural network layer has an associated set of kernels. Each kernel includes values established by a neural network model created by a user. In some implementations, kernels identify particular image contours, shapes, or colors. In some implementations, kernels can be represented as a matrix structure of weight inputs. In some implementations, a CONV layer can also process a set of activation inputs. The set of activation inputs can also be represented as a matrix structure. A RELU layer can apply an element-wise activation function, such as the max(0,x) thresholding at zero. A POOL layer can perform a downsampling operation along the spatial dimensions (e.g., width or height). A fully-connected layer (FC layer) can compute the class scores, and each neuron in the FC layer can be connected to all the numbers in the previous volume.

In some implementations, some layers of the ConvNet contain trainable parameters (i.e., parameters whose values are update or otherwise derived via the training or learning process), and others do not. For example, the CONV/FC layers perform transformations that are a function of not only the activations in the input volume, but also of trainable parameters (the weights and biases of the neurons). On the other hand, the RELU/POOL layers can implement a fixed function and do not have trainable parameters. The trainable parameters in the CONV/FC layers can be trained with gradient descent so that the class scores that the ConvNet computes are consistent with the labels in the training set for each image. In some implementations, some layers of the ConvNet may or may not have additional hyper-parameters. For example, the CONV/FC/POOL layers may have additional hyper-parameters (i.e., parameters whose values are set prior to the commencement of the training or learning process), while the RELU layer does not.

In some implementations, a ConvNet takes GIS data as an input, and predicts received signal strength matrix as an output. In some implementations, rather than relying on physical laws of wave propagation, the ConvNet learns complex relations between input GIS data and the received signal strength from a large amount of training data (e.g., hundreds of thousands or more). A ConvNet can have hundreds of millions of parameters (or weights in neural network terminology) that are learned from training. As such, the ConvNet is able to process detailed GIS information as the input and can capture complex relations between the input GIS data and output received signal strength data.

In some implementations, unlike conventional neural networks, a unique cross-layer structure is designed for the deep neural network for received signal strength prediction. The unique cross-layer structure allows the deep neural network to achieve more accurate received signal strength prediction than conventional neural networks, such as those used for image classification.

In some implementations, to obtain a deep neural network for accurate received signal strength prediction, a sufficient amount of training data (e.g., a few hundred thousand to millions of data points) may be needed. Example techniques for generating sufficient training data are described. Moreover, example training methods are proposed for obtaining a suitable deep neural network for the received signal strength prediction. In some implementations, the deep neural network can be trained using real-world received signal strength data, simulated received signal strength data or both. For example, the deep neural network can be first trained using simulated received signal strength data and corresponding GIS maps. The simulated received signal strength data can be obtained based on existing received signal strength prediction methods (e.g., statistical or deterministic methods). The simulated received signal strength data can be obtained from received signal strength simulators (e.g., VOLCANO). In some implementations, the deep neural network trained based on the simulated received signal strength data can then be fine-tuned using actual received signal strength data, for example obtained from road tests. As a result, the ultimate trained neural network can work well in the real world with minor or no tuning.

In some implementations, the techniques described in this disclosure can achieve one or more advantages. For example, the techniques described in this disclosure be implemented as a fast and accurate received signal strength prediction method for automatic site planning (ASP) to predict signal coverage in a telecommunication network. For example, the described techniques can be used in existing or future-generation communication networks, including but not limited to, long term evolution (LTE), LTE-Advanced (LTE-A), 5G, Global System for Mobile communication (GSM), General Packet Radio Service (GPRS), Enhanced Data rates for GSM Evolution (EDGE), Interim Standard 95 (IS-95), Code Division Multiple Access (CDMA) 2000, Evolution-Data Optimized (EVDO), Universal Mobile Telecommunications System (UMTS), wireless local access network (WLAN), and the like.

In some implementations, the described techniques can improve accuracy of received signal strength prediction. For example, the described techniques using the deep neural network can capture complex relations between the GIS data and the received signal strength, whereas the statistical models, such as HATA, has only a few parameters and can only capture simple relations between the GIS data and the received signal strength. In some implementations, the described techniques can obtain more accurate results than deterministic methods such as ray tracing methods, for example, in the case where the input is incomplete GIS data.

In some implementations, the described techniques can improve computational efficiency and reduce computational load of received signal strength prediction using conventional methods. For example, in some instances, the described techniques can be 10,000 times faster in computation compared to ray tracing methods using normal workstations with a graphic processing unit (GPU). One implementation of the described techniques needs only 20 milliseconds to calculate the received signal strength for one site on a regular workstation, compared to four minutes required by VOLCANO.

FIG. 1 is a schematic diagram illustrating an example process flow 100 of predicting received signal strength using a deep neural network, according to an implementation. The example process flow 100 shows that a deep neural network 120 can receive one or more GIS map patches 110 of a site as input, and return received signal strength matrix 130 as output. In the illustrated example, the deep neural network 120 is a deep convolutional neural network (ConvNet) 120. The GIS map patches of a site 110 can include one or more layers of a GIS map of an area of interest. The received signal strength matrix 130 can include a received signal strength matrix 130 for each grid in the area of interest.

In some implementations, the layers of the GIS map (e.g., the GIS map patches) 110 can include, for example, a building height map layer, a terrain layer, a clutter layer, and any other layers. In some implementations, the input of the deep neural network 120 can include satellite, aviation photos, or other image data. The site or area of interest can be, for example, a cell in a cellular communication network. The cell can include a base station at the center. In some implementations, the height of the building at the pixel where the base station is located can be configured or modified to be the antenna height of the base station. In other words, the antenna height of the base station can be captured by the building map layer.

The received signal strength matrix 130 can include a received signal strength value for each grid in the area of interest. The received signal strength matrix 130 has two dimensions, three dimensions, or higher dimensions. For example, the received signal strength value for each grid in the area of interest can be a received signal strength value for each grid in the area of interest with respect to different locations of the grid, different locations of the base station, different antenna heights of the base station, different environments (e.g., urban or rural, vegetation or foliage), different propagation media (e.g., dry or moist air), or other attributes that may affect the received signal strength value in the area of interest. In some implementations, the predicted received signal strength, as the output of the deep neural network 120, can be represented in a table, an array, a figure, or a combination of these and other forms, in addition to or as an alternative to a received signal strength matrix.

Figure 2:
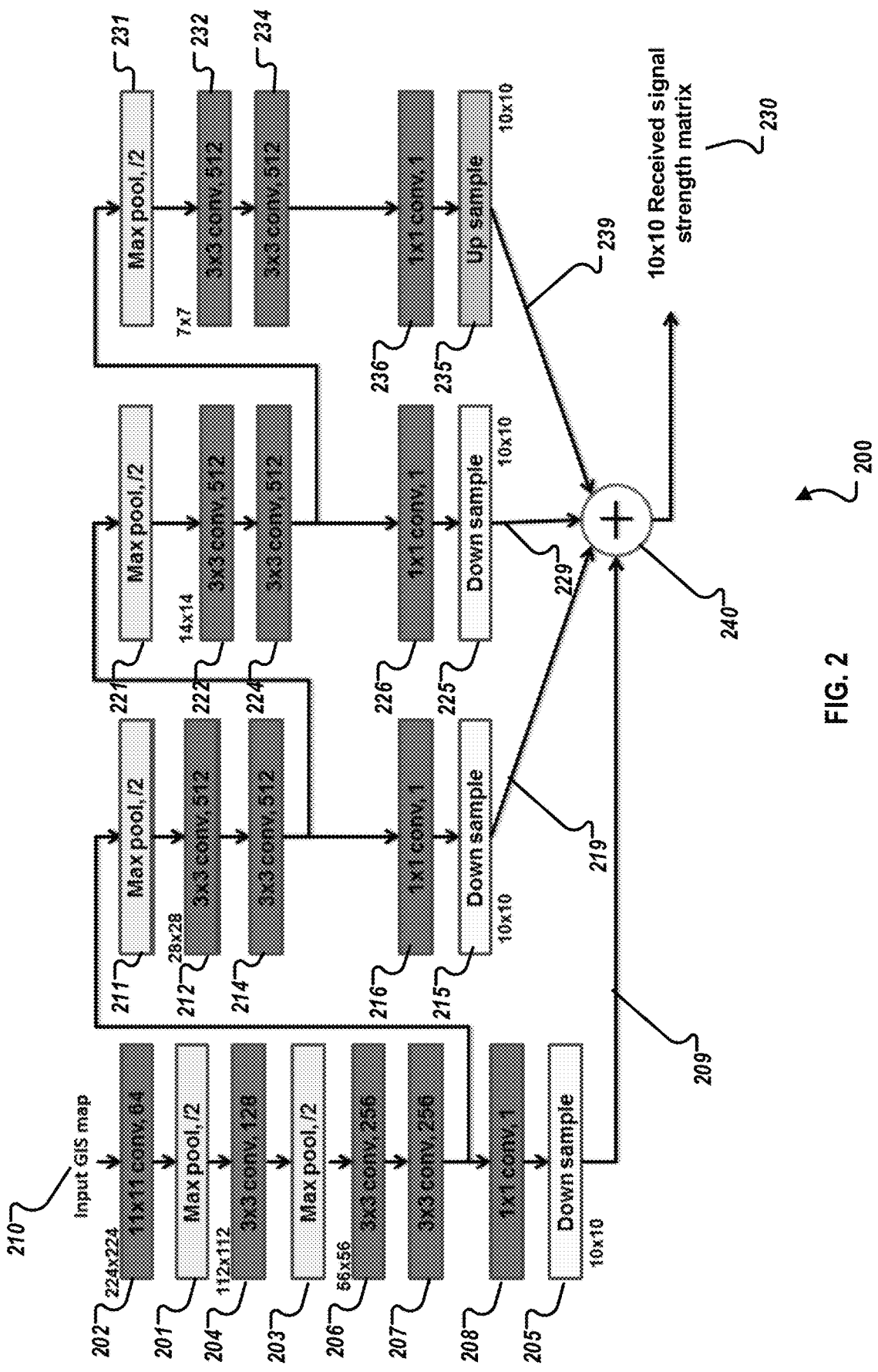
FIG. 2 is a schematic diagram illustrating an example structure of a deep neural network for predicting received signal strength, according to an implementation.

FIG. 2 is a schematic diagram illustrating an example structure of a deep neural network 200 for predicting received signal strength, according to an implementation. In the illustrated example, the deep neural network 200 receives a GIS map patches 210 of 224 pixels by 224 pixels as input, and predicts a 10-by-10 received signal strength matrix 230 (each bin is 22.4 pixels by 22.4 pixels) as output. In general, the input patches can be of any size and the predicted received signal strength can be at any grid.

The deep neural network 200 include multiple convolution layers (e.g., convolution layers 202, 204, 206, 207, 208, 212, 214, 216, 222, 224, 226, 232, 234, and 236) and pooling layers (e.g., pooling layers 201, 203, 211, 221, and 231). Note that a RELU layer is implicitly included after a convolution operation of each convolution layer in the deep neural network 200. In the illustrated example, the convolution layer 202 labeled with "11×11 conv, 64" denotes a convolution layer with 11×11 kernel, 64 channels. Similarly, the convolution layer 204 labeled with "3×3 conv, 128" denotes a convolution layer with 3×3 kernel, 128 channels. The pooling layer 201, 203, 211, 221, or 231 labeled with "Max pool, /2" denotes a max pooling layer that down samples the input by 2 in both x and y dimensions.

In some implementations, a single "forward pass" of the deep neural network 200 (e.g., a single serial or sequential flow from the top convolution layer 202 to the bottom layer convolution layer 236) can be used to predict the received signal strength. Using the single serial structure of the deep neural network 200 can achieve satisfactory prediction accuracy, for example, for predicting the received signal strength at a single location in a geographic area. In some instances, such a single serial structure of the deep neural network 200 may not achieve satisfactory prediction accuracy for predicting the received signal strength at two or more locations in the geographic area.

In some implementations, the deep neural network 200 for predicting received signal strength (e.g., at more than one location of a geographic area) can have a cross-layer structure that combines local and global information of the geographic area to estimate received signal strength. The local information can be reflected by an output of a convolution layer that is closer to the input GIS map patches 210, while the global information can be reflected by an output of a convolution layer that is farther away from the input GIS map patches 210. The more layers the input data goes through, the more abstraction is applied to the input data. In some implementations, outputs of lower and upper layers of the deep neural network 200 can be combined to provide more accurate predictions of received signal strength as the final output of the deep neural network 200. For example, the final output received signal strength matrix 230 of the deep neural network 200 is constructed by combining outputs of various layers at various depths of the deep neural network 200. A depth of a specific layer in the deep neural network refers to the number of layers that the input data goes through until after reaching the specific layer in the deep neural network. For example, as illustrated in the deep neural network 200, the convolution layer 202 has a depth of 1, and the pooling layer 201 has a depth of 2. The final output received signal strength matrix 230 combines, by a summation at 240, an output 209 from a down-sample layer 205 at a depth of 8 following the convolution layer 208 at a depth of 7, an output 219 from a down-sample layer 215 at a depth of 13 following the convolution layer 216 at a depth of 12, an output 229 from a down-sample layer 225 at a depth of 18 following the convolution layer 226 at a depth of 17, and an output 239 from an up-sample layer 235 at a depth of 23 following the convolution layer 236 at a depth of 22. In some implementations, up-sample or down-sample are performed to have a unified dimension of the outputs from different layers. The final output received signal strength matrix dimension can determine whether a down-sample or an up-sample need to be implemented for an output from certain convolutional layers. In some implementations, the final output received signal strength matrix 230 of the deep neural network 200 can combine outputs of different or additional layers at various depths of the deep neural network 200. The number and depth of the layers of the deep neural network 200 for combination can be determined or optimized based on a desired prediction accuracy, available computational resources, or other factors.

In some implementations, the prediction accuracy of the received signal strength using a deep neural network depends on a successful training of the deep neural network. One goal of training a neural network is to adjust the parameters (e.g., the weights and biases of the neurons) of the deep neural network to minimize a loss function. In some implementations, a loss function measures the compatibility (e.g., in terms of difference or error) between a prediction (e.g. the class scores in classification) and the ground truth label.

Successful training of a deep neural network may rely on a few hundred thousand to a million pairs of map patches (e.g., the GIS map patches) and ground truth received signal strength matrices. However, it may be difficult to obtain all the data from real-world base stations. In some implementations, a deep neural network trained using only ten thousand data samples may not give accurate received signal strength prediction results.

In order to properly train a deep neural network for received signal strength prediction, both simulated and actual received signal strength data can be used. For example, commercial received signal strength prediction software can be used to generate millions of received signal strength prediction using simulation (e.g., based on the ray tracing method). The simulated received signal strength data can be used as ground truth to train a deep neural network.

Then, actual received signal strength data (e.g., the real field data) can be used to fine tune the deep neural network.

Figure 3:
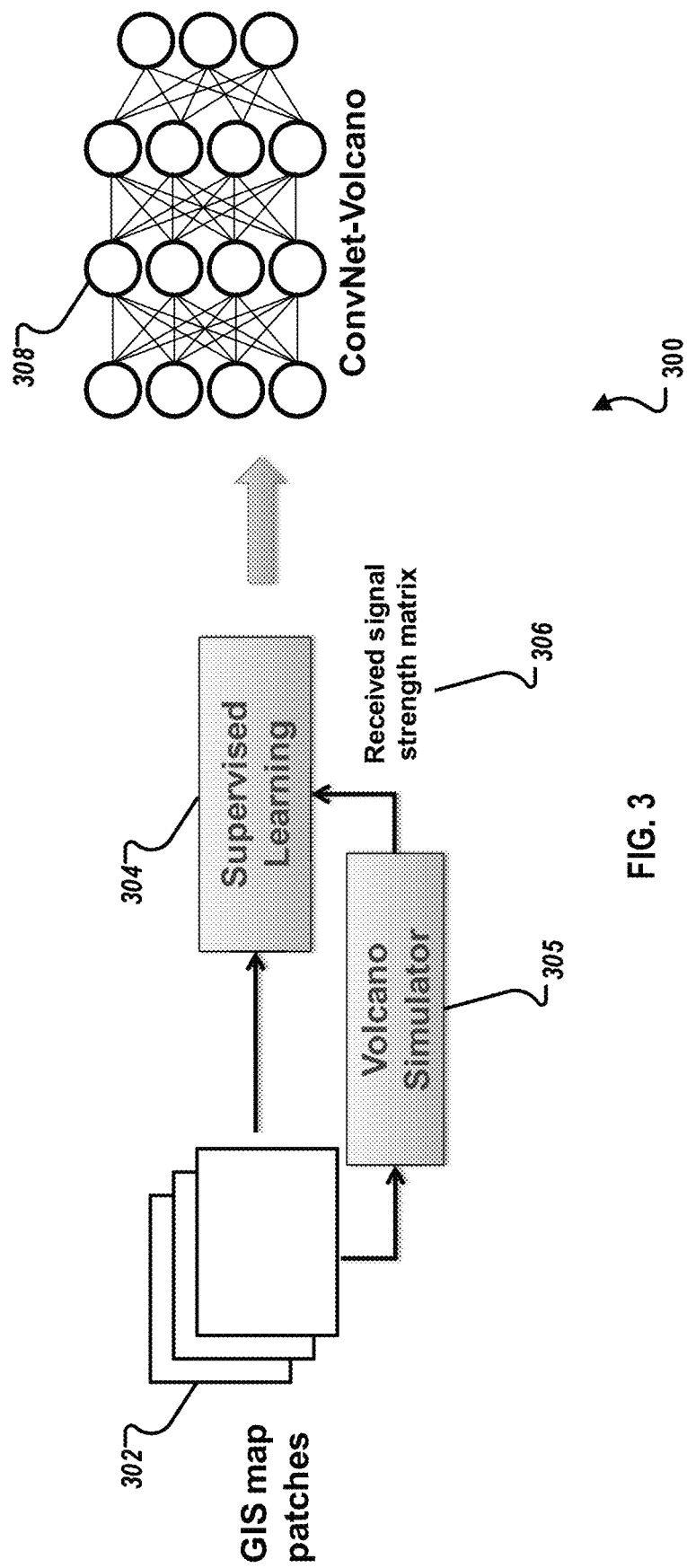
FIG. 3 is a schematic diagram illustrating an example process flow of training a deep neural network for predicting received signal strength, according to an implementation.

FIG. 3 is a schematic diagram illustrating an example process flow 300 of training a deep neural network for predicting received signal strength, according to an implementation. The example process flow 300 uses VOLCANO simulator 305, a commercial received signal strength prediction software, as an example received signal strength simulator for generating the simulated received signal strength data to train the deep neural network. As illustrated, the VOLCANO simulator 305 can receive millions of GIS map patches 302 as input and generate corresponding received signal strength matrices 306 based on the received signal strength simulation algorithms implemented by the VOLCANO simulator 305. Supervised learning 304 can be performed to generate a trained deep neural network, ConvNet-VOLCANO 308, based on the simulated training data obtained from the VOLCANO simulator 305. For example, the supervised learning 304 can receive the GIS map patches 302 as the input and the corresponding received signal strength matrices 306 as the ground truth (or a supervisor) and determine the parameters (e.g., the weights and biases of the neurons) of the ConvNet-VOLCANO 308 that minimize a loss function. Various supervised learning algorithms and loss function can be used for the supervised learning 304 to obtain the trained deep neural network, ConvNet-VOLCANO 308.

Figure 4:
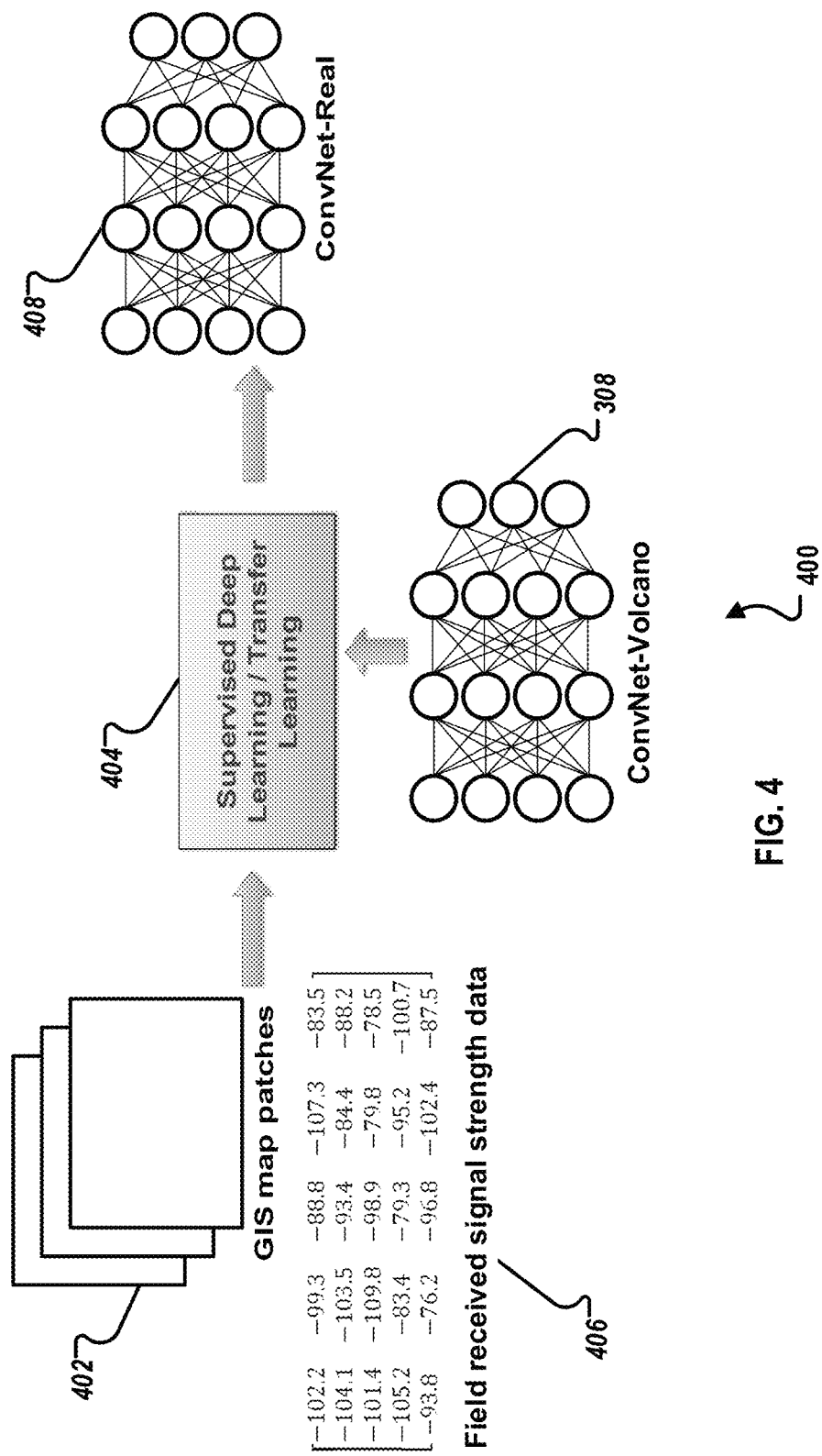
FIG. 4 is a schematic diagram illustrating another example process flow of training a deep neural network for predicting received signal strength, according to an implementation.

FIG. 4 is a schematic diagram illustrating another example process flow 400 of training deep neural network for predicting received signal strength, according to an implementation. The example process flow 400 fine tunes the ConvNet-VOLCANO 308, a deep neural network trained based on simulated received signal strength data, using field received signal strength data 406. As illustrated, supervised learning 404 can be performed to generate another trained deep neural network, ConvNet-Real 408, by using the ConvNet-VOLCANO 308 as the original deep neural network, and updating the parameters of the ConvNet-VOLCANO 308 based on the GIS map patches 402 and the corresponding field received signal strength data 406. In some implementations, the resulting ConvNet-Real 408 is a trained deep neural network to minimize a loss function of the supervised learning 404 that receives the GIS map patches 402 as the input and the corresponding field received signal strength data 406 as the ground truth. Various supervised learning algorithms and loss function can be used for the supervised learning 404 to obtain the fine-tuned deep neural network, ConvNet-Real 408.

In some implementations, the number (e.g., about 10,000) of available GIS map patches 402 and the corresponding field received signal strength data 406 is much less than that (e.g., millions) of the simulated received signal strength data (e.g., received signal strength matrices 306) in FIG. 3. Compared to using either the simulated received signal strength matrices 306 or the field received signal strength data 406 alone, the resulting fined tuned deep neural network, ConvNet-Real 408 based on both the simulated received signal strength matrices 306 and the field received signal strength data 406 can give more accurate prediction results.

Figure 5:
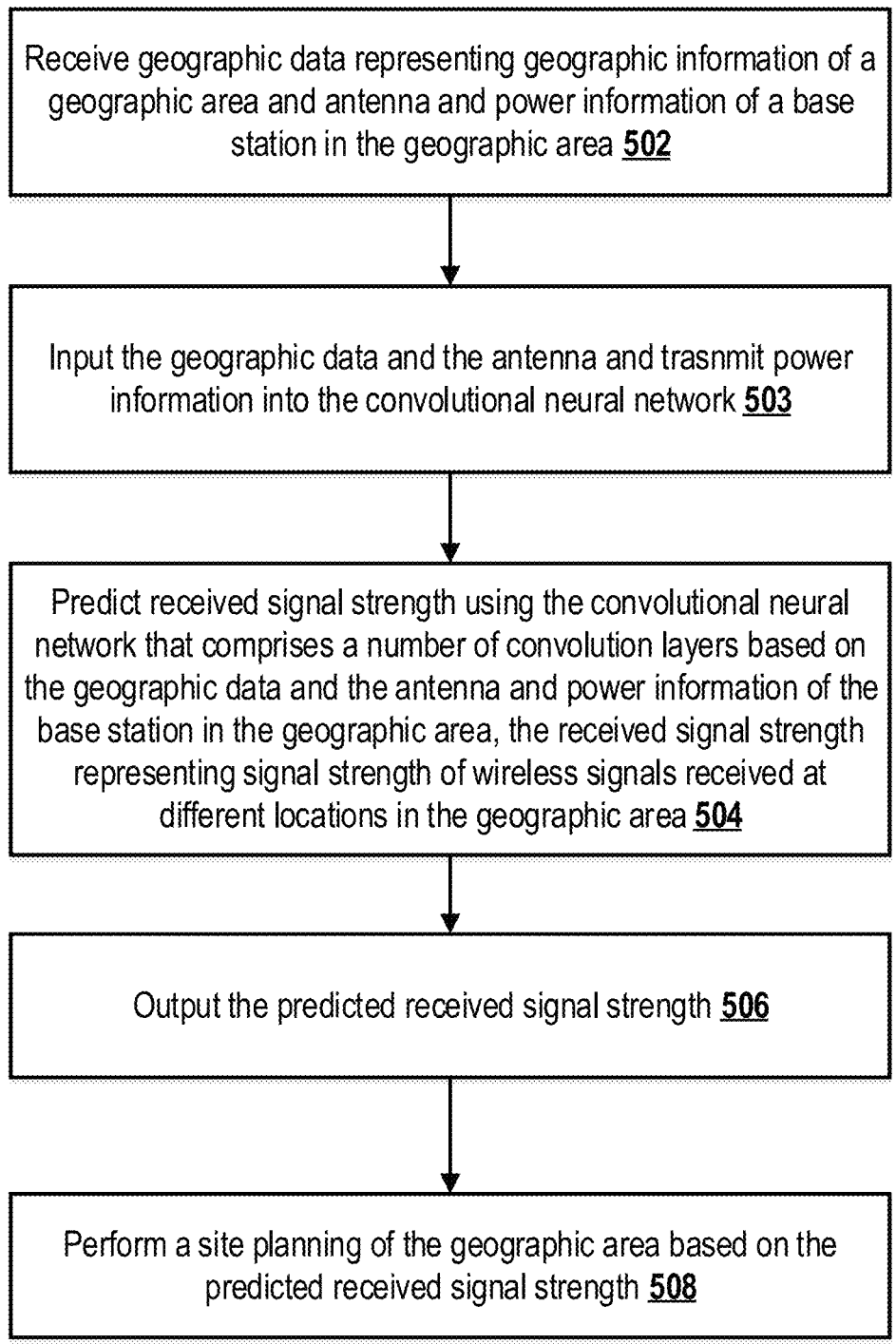
FIG. 5 is a flowchart illustrating an example method for predicting received signal strength in a telecommunication network using a deep neural network, according to an implementation.

FIG. 5 is a flowchart illustrating an example method 500 for predicting received signal strength in a telecommunication network using a deep neural network, according to an implementation. The method 500 can be implemented by one or more processors that execute a convolutional neural network that includes a number of convolution layers. The one or more processors can be within a single computing device or distributed among multiple computing devices or cloud. In some implementations, the one or more processors can be a processor 705 shown in FIG. 7.

The convolutional neural network can be a deep neural network (e.g., the deep neural network 120 or 200, the ConvNet-VOLCANO 308, and ConvNet-Real 408). In some implementations, the convolutional neural network is trained by using both simulated received signal strength data and actual received signal strength data, such as the ConvNet-Real 408.

In some implementations, the convolutional neural network can have a single serial structure in that the final output of the convolutional neural network (e.g., predicted received signal strength corresponding to different locations of a geographic area) results from an input signal (e.g., geographic data and/or antenna and power information of a base station in the geographic area) passing through the number of convolution layers of the convolutional neural network in sequence via a single serial path (e.g., via a single serial path from the top convolution layer 202 to the bottom layer convolution layer 236 of the deep neural network 200 without any branching or combining from outputs from intermediate layers). In some implementations, the convolutional neural network that has the single serial structure can be used to predict received signal strength at a single location in the geographic area.

In some implementations, the convolutional neural network can have a cross-layer structure in that the final output of the convolutional neural network is determined by combining (intermediate) outputs of two or more (intermediate) layers at different depths of the convolutional neural network. In some implementations, combining outputs of two or more layers at different depths of the convolutional neural network includes using the outputs of the two or more layers as input to one or more additional neural network layers to generate one or more outputs. In some implementations, the convolutional neural network that has the cross-layer structure can be used to predict received signal strength at different locations in the geographic area.

The method 500 can also be implemented using additional, fewer, or different entities. Furthermore, the method 500 can also be implemented using additional, fewer, or different operations, which can be performed in the order shown or in a different order. In some instances, an operation or a group of operations can be iterated or repeated, for example, for a specified number of iterations or until a terminating condition is reached.

The example method 500 begins at 502, where one or more processors receive geographic data representing geographic information of a geographic area (e.g., an area of interest or a site in a wireless communication system). The geographic data can include geographic image data such as geographic information system (GIS) data (e.g., the GIS map patches 110, 210, 302, or 402) that includes one or more of a building height map layer, a terrain layer, or a clutter layer representing geographic information of a geographic area. In some implementations, the geographic image data includes one or more of a satellite picture, an aviation picture, or other image data associated with the geographic area. The geographic data can be represented in a vector, a matrix, a tensor, or any other appropriate format.

In some implementations, receiving the geographic data includes receiving the geographic data from a user interface or a communication interface. In some implementations, receiving the geographic data includes retrieving the geographic data from a memory, database, or another data storage device. In some implementations, receiving the geographic data includes obtaining the geographic data from one or more other sources.

In some implementations, the one or more processors further receive antenna and power information of a base station in the geographic area. The antenna information and power information of the base station can include, for example, one or more of location, height, azimuth (e.g., horizontal direction of main beam), down tilt (e.g., vertical direction of main beam), radiation pattern of an antenna and transmission power or other settings of the base station in the geographic area. In some implementations, the antenna and transmit power information of the base station in the geographic area includes free-space received signal strength representing free-space received signal strength of wireless signals received at different locations in the geographic area, wherein the free-space received signal strength the different locations in the geographic area are calculated based on a transmission power of the antenna, a radiation pattern of the antenna, and respective distances from the different locations in the geographic area to the antenna of the base station.

In some implementations, the one or more processors further compute or otherwise determine a multi-dimensional tensor (e.g., a tensor with two or more dimensions, such as a 4-dimensional (4D) tensor) based on the geographic data (e.g., raw information contained in the GIS maps) and the antenna and power information of the base station, for example, based on known physical laws (e.g., free-space path loss and signal attenuation based on material permittivity). The multi-dimensional tensor can be input into the convolutional neural network for predicting the received signal strength. In some implementations, the accuracy of the prediction can be improved since such known-to-be-correct laws do not need to be learned by the convolutional neural network from data, thus alleviating the learning tasks of the convolutional neural network during training. In some implementations, the learned convolutional neural network model can be frequency independent because frequency affects free-space signal strength (maybe reflection coefficient as well). An example of the multi-dimensional tensor is described below with respect to FIGS. 10-15.

Figure 10:
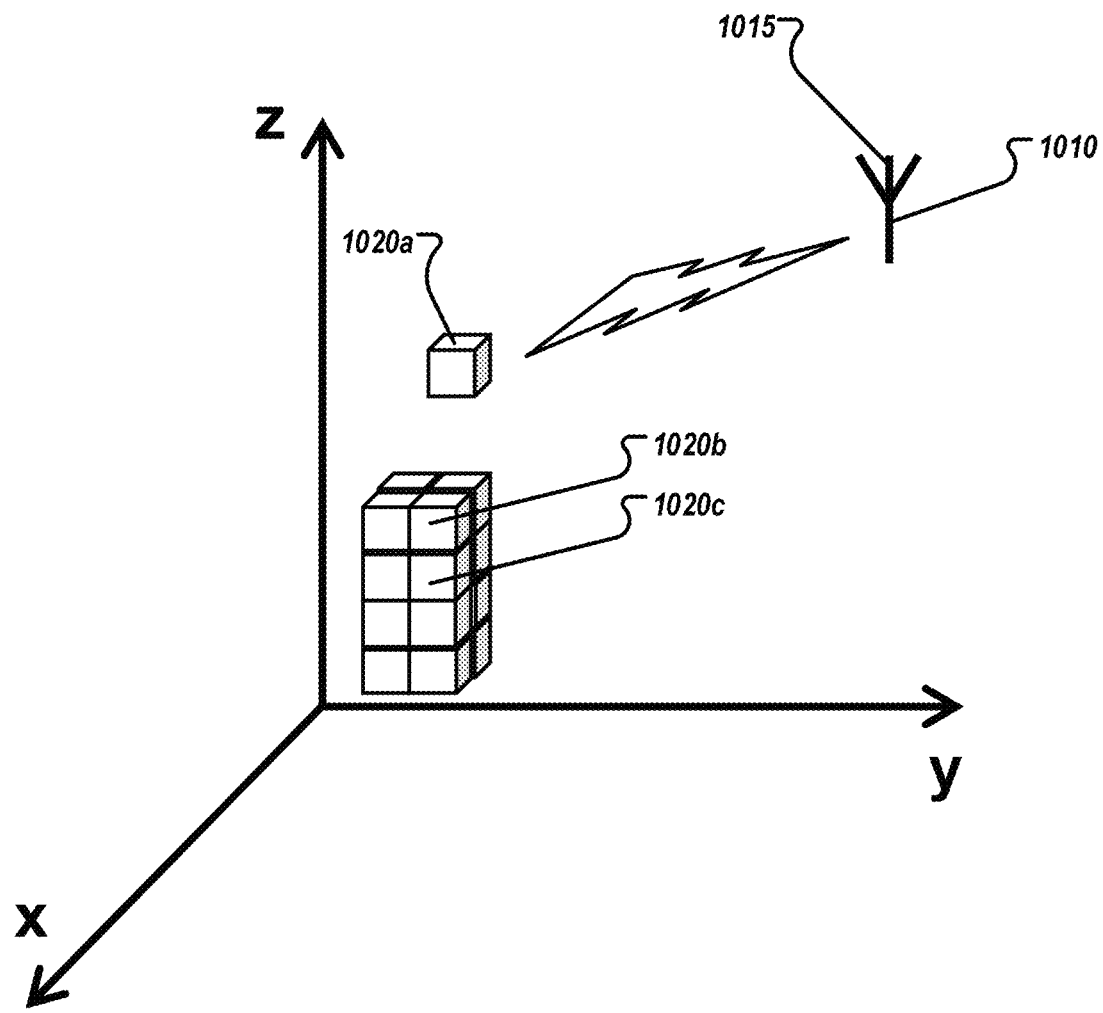
FIG. 10 is a schematic diagram illustrating an example model of a geographic area for predicting received signal strength of wireless signals received at different locations in the geographic area, according to an implementation.

FIG. 10 is a schematic diagram illustrating an example model of a geographic area 1000 for predicting received signal strength of wireless signals received at different locations in the geographic area, according to an implementation. The geographic area 1000 can be a terrestrial area (e.g., an urban or rural area) that includes a base station 1010 that has one or more antennas 1015. In some implementations, space surrounding the base station 1010 in the geographic area 1000 can be discretized into multiple cubes 1020*a*, 1020*b*, 1020*c*, etc. (collectively, cubes 1020). The location of each cube 1020 can be represented, for example, by corresponding geographic coordinates (e.g., x, y, and z) of the center of the cube 1020 in the space. In some implementations, the x and y coordinates of the geographic area 1000 can be determined based on the geographic data (e.g., the building and terrain layers) of the geographic area 1000. z coordinate can be indexed by the combined height of building and terrain. In some implementations, a 2D or 3D space surrounding a geographic area can be discretized into bins, grids, or other elements without departing from the scope of this disclosure.

In some implementations, each cube 1020 can be of k meters by k meters by k meters, where k is the length of the edge. k can be decided by a resolution of a map of the geographic area 1000. For example, a 5 m×5 m×5 m unit cube can be used for a map with 5 m resolution. In some implementations, by design, the z coordinate can be limited to a certain range, for example, from 0 to 250 m. In this case, there are 50 elements (50×5 m=250 m) in the z direction. The ranges of the x and y coordinates can be limited as well. As such, a total number of cubes in the space of the geographic area 1000 can be determined.

An example multi-dimensional tensor can be a 4D tensor that includes multiple channels of 3D tensors. In each channel, the x and y coordinates can be determined according to the building and terrain layers of the geographic area 1000; and the z coordinate is indexed by the combined height of building and terrain of the geographic area 1000. The multiple channels of 3D tensors can include one or more of, for example, a free-space received signal strength tensor, a horizontal line of sight angle tensor, a vertical line of sight angle tensor, a permittivity tensor, or a user equipment (UE) location tensor.

A free-space received signal strength tensor can include free-space received signal strength of wireless signals received at different locations in the geographic area. The free-space received signal strength refers to received signal strength of a wireless signal received at a certain location in free space (typically air) which includes no obstacles that might cause reflection, refraction, or any other attenuation except free-space path loss. The free-space path loss is the attenuation of signal strength (e.g., power or energy) when the wireless signal (e.g., an electromagnetic wave) travels over a line of sight (LOS) path in the free space.

As an example, the free-space received signal strength tensor can include free-space received signal strength of multiple cubes 1020 in the space of the geographic area 1000. The free-space received signal strength of each cube 1020 can be represented, for example, by free-space received signal strength at the center of the cube 1020. In some implementations, the free-space received signal strength tensor can include multiple cubes with corresponding free-space received signal strength represented by (x, y, z, P), where x, y, z are the coordinates of the center of the cube 1020 and P represents the free-space received signal strength at the center of the cube 1020.

The free-space received signal strength at the center of the cube 1020 can be calculated based on, for example, transmission power of the antenna 1015, radiation pattern of the antenna 1015, the azimuth and tilt angles of the cube relative to the antenna 1015, and a distance between the cube 120 and the antenna 1015. In some implementations, a free-space path loss formula can be used to calculate the attenuation along the path between the cube 1020 and the antenna 1015 of the base station 1010. In some implementations, the free-space received signal strength of each cube 1020 can be calculated assuming the antenna 1015 is located in the center in x and y coordinates.

Figure 11B:
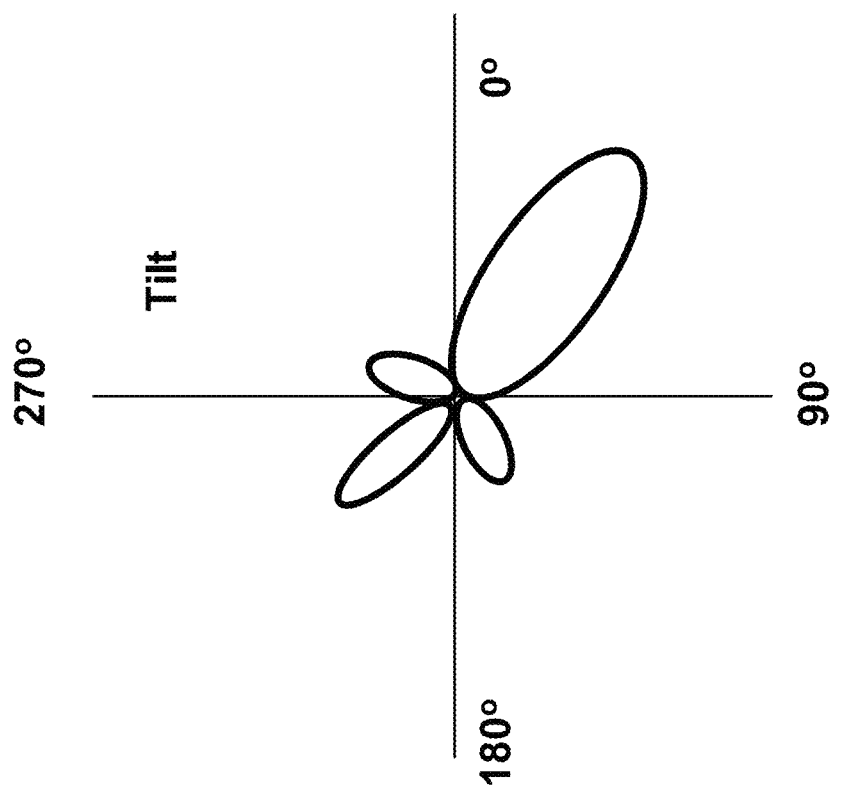
FIG. 11B is a schematic diagrams illustrating an example antenna radiation pattern from a perspective of a plane of a tilt angle, according to an implementation.
Figure 11A:
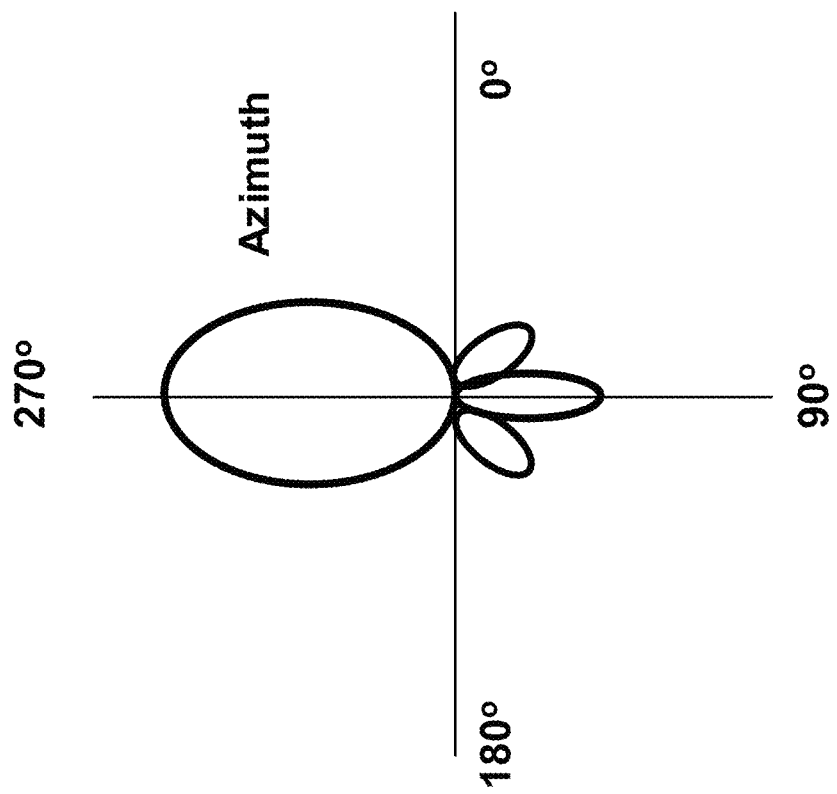
FIG. 11A is a schematic diagrams illustrating an example antenna radiation pattern from a perspective of a plane of an azimuth angle, according to an implementation.

In some implementations, a tensor can be created that contains some or all engineering parameters (e.g., antenna coordinates, height, azimuth, tilt, and antenna radiation pattern). The engineering parameters can be used to calculate free-space received signal strength. FIG. 11A is a schematic diagrams illustrating an example antenna radiation pattern 1100 from a perspective of a plane of an azimuth angle, according to an implementation; FIG. 11B is a schematic diagrams illustrating an example antenna radiation pattern 1150 from a perspective of a plane of a tilt angle, according to an implementation.

A horizontal LOS angle tensor can include horizontal LOS angles at different locations in a geographic area with respect to a base station in the geographic area. In some implementations, the different locations can be represented by different cubes (e.g., cubes 1020 in the space of the geographic area 1000 in FIG. 10), bins, grids, or other elements. As such, the horizontal LOS angle tensor can include horizontal LOS angles of multiple cubes with respect to the base station in the geographic area.

Figure 12:
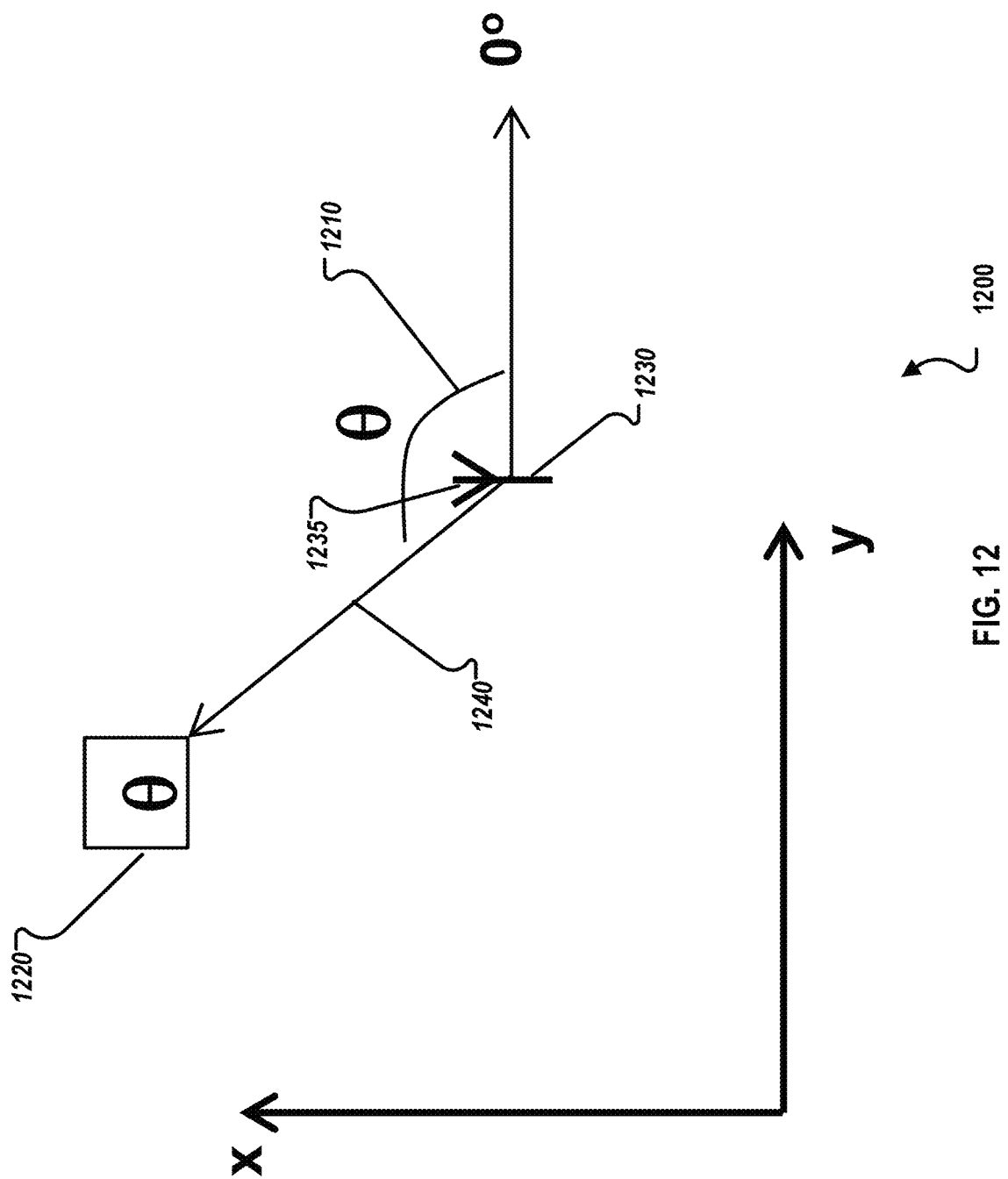
FIG. 12 is a schematic diagram illustrating an example horizontal line of sight (LOS) angle of a location in a geographic area with respect to a base station in the geographic area, according to an implementation.

FIG. 12 is a schematic diagram illustrating an example horizontal LOS angle 1210 of a location in a geographic area 1200 with respect to a base station 1230 in the geographic area, according to an implementation. The geographic area 1200 can be a terrestrial area (e.g., an urban or rural area) that includes the base station 1230 that has one or more antennas 1235. Similar to FIG. 10, in some implementations, space surrounding the base station 1230 in the geographic area 1200 can be discretized into multiple cubes (only one cube 1220 is shown in FIG. 12). The location of the cube 1220 can be represented, for example, by corresponding geographic coordinates (e.g., x, y, and z) of the center of the cube 1220 in the space. For simplicity, FIG. 12 only shows in cubes in 2D. The horizontal LOS angle θ 1210 can refer to the horizontal angle θ (in the x-y plane) of an LOS path 1240 from the antenna 1235 of the base station 1230 to the cube 1220. In some implementations, the horizontal LOS angle tensor can include multiple cubes with corresponding horizontal LOS angles, each represented by (x, y, z, θ).

A vertical LOS angle tensor can include vertical LOS angles at different locations in a geographic area with respect to a base station in the geographic area. In some implementations, the different locations can be represented by different cubes (e.g., cubes 1020 in the space of the geographic area 1000 in FIG. 10), bins, grids, or other elements. As such, the vertical LOS angle tensor can include vertical LOS angles of multiple cubes with respect to the base station in the geographic area.

Figure 13:
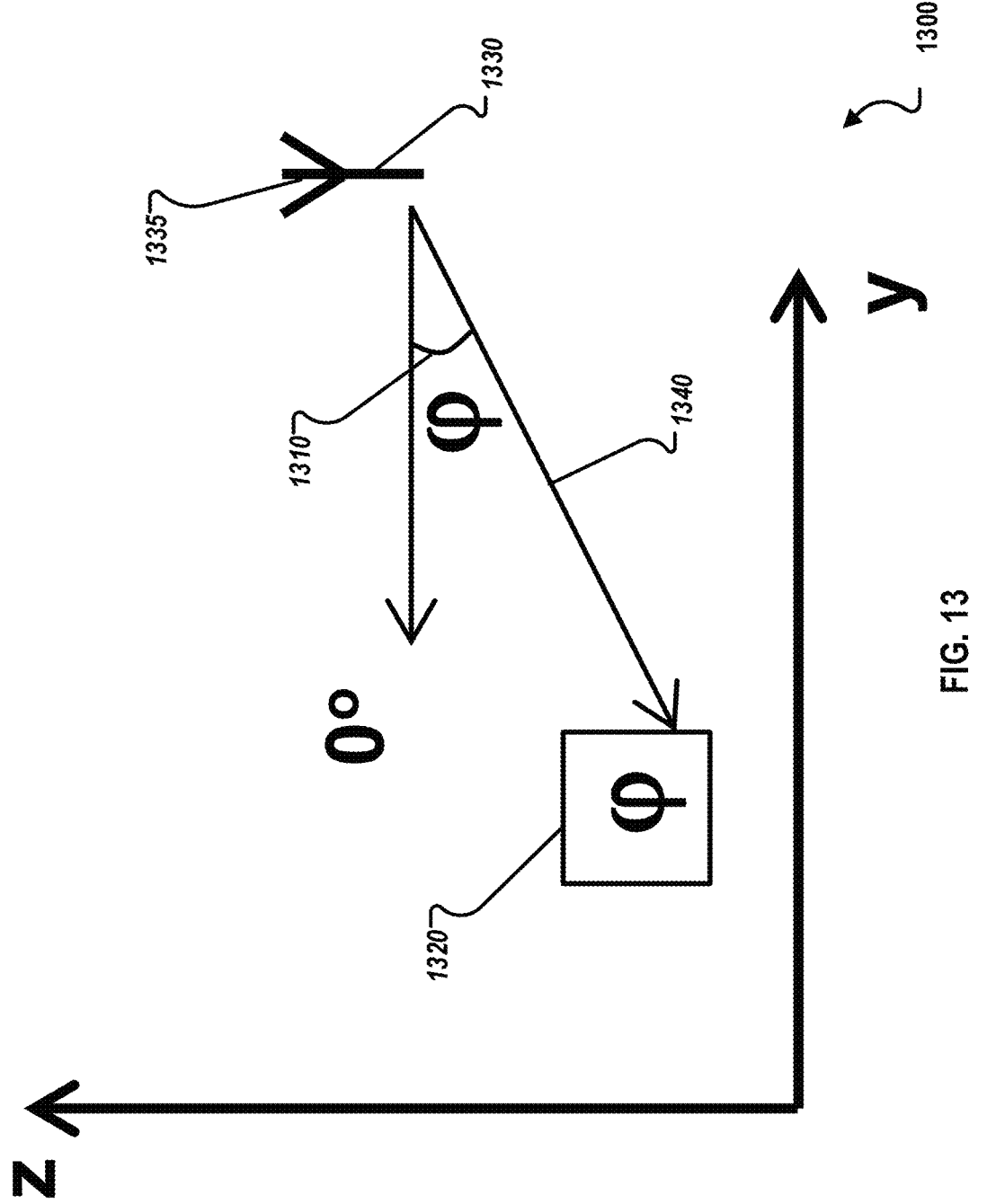
FIG. 13 is a schematic diagram illustrating an example vertical LOS angle of a location in a geographic area with respect to a base station in the geographic area, according to an implementation.

FIG. 13 is a schematic diagram illustrating an example vertical LOS angle 1310 of a location in a geographic area 1300 with respect to a base station 1330 in the geographic area 1300, according to an implementation. The geographic area 1300 can be a terrestrial area (e.g., an urban or rural area) that includes the base station 1330 that has one or more antennas 1335. Similar to FIG. 10, in some implementations, space surrounding the base station 1330 in the geographic area 1300 can be discretized into multiple cubes (only one cube 1320 is shown in FIG. 13). The location of the cube 1320 can be represented, for example, by corresponding geographic coordinates (e.g., x, y, and z) of the center of the cube 1320 in the space. For simplicity, FIG. 13 only shows in cubes in 2D. The vertical LOS angle θ 1310 can refer to the vertical angle φ (in the y-z plane) of an LOS path 1340 from the antenna 1335 of the base station 1330 to the cube 1320. In some implementations, the vertical LOS angle tensor can include multiple cubes with corresponding vertical LOS angles, each represented by (x, y, z, φ).

A permittivity tensor can include values of permittivity or relative permittivity at different locations in a geographic area and can be used to calculate how much a wireless signal will be reflected at a boundary between two materials. The permittivity is a measure of a material's ability to resist an electric field. The relative permittivity of a material is its (absolute) permittivity expressed as a ratio relative to the permittivity of vacuum. Table 1 lists relative permittivities of some materials at room temperature under 1 kHz. In some implementations, the permittivity tensor can include other metrics for calculating the reflection of a wireless signal at the boundary between two materials at a certain location in a geographic area.

TABLE 1 relative permittivities of some materials at room temperature under 1 kHz

| Material | Relative Permittivity $\varepsilon_r$ |
|---|---|
| Vacuum | 1 (by definition) |
| Air | 1.00058986 ± 0.00000050 (at STP, for 0.9 MHz) |
| PTFE/Teflon | 2.1 |
| Polyethylene/XLPE | 2.25 |
| Polyimide | 3.4 |
| Polypropylene | 2.2-2.36 |
| Polystyrene | 2.4-2.7 |
| Carbon disulfide | 2.6 |
| Mylar | 3.1 |
| Paper | 3.85 |
| Electroactive polymers | 2-12 |
| Mica | 3-6 |
| Silicon dioxide | 3.9 |
| Sapphire | 8.9-11.1 (anisotropic) |
| Concrete | 4.5 |
| Pyrex (Glass) | 4.7 (3.7-10) |
| Neoprene | 6.7 |
| Rubber | 7 |
| Diamond | 5.5-10 |
| Salt | 3-15 |
| Graphite | 10-15 |
| Silicon | 11.68 |
| Silicon nitride | 7-8 (polycrystalline, 1 MHz) |
| Ammonia | 26, 22, 20, 17 (−80, −40, 0, 20° C.) |
| Methanol | 30 |
| Ethylene glycol | 37 |
| Furfural | 42.0 |
| Glycerol | 41.2, 47, 42.5 (0, 20, 25° C.) |
| Water | 88, 80.1, 55.3, 34.5 (0, 20, 100, 200° C.) for visible light: 1.77 |
| Hydrofluoric acid | 175, 134, 111, 83.6 (−73° C., −42° C., −27° C., 0° C.) |
| Hydrazine | 52.0 (20° C.) |
| Formamide | 84.0 (20° C.) |
| Sulfuric acid | 84-100 (20-25° C.) |
| Hydrogen peroxide | 128 aq-60 (−30-25° C.) |
| Hydrocyanic acid | 158.0-2.3 (0-21° C.) |
| Titanium dioxide | 86-173 |
| Strontium titanate | 310 |
| Barium strontium titanate | 500 |
| Barium titanate | 1200-10,000 (20-120° C.) |
| Lead zirconate titanate | 500-6000 |
| Conjugated polymers | 1.8-6 up to 100,000 |
| Calcium copper titanate | >250,000 |

Different locations in the geographic area can include different material or media, such as, air, concrete, soil, and glass. In some implementations, the different locations can be represented by different cubes (e.g., cubes 1020 in the space of the geographic area 1000 in FIG. 10), bins, grids, or other elements. The dominant material in each cube can be used for determining the permittivity or relative permittivity at the corresponding location of the cube in the geographic area. As such, the permittivity tensor can include respective permittivities or relative permittivities of multiple cubes in the geographic area.

In some implementations, image processing on satellite photos of the the geographic area can be used to automatically extract material related information, for example, to determine respective dominant materials at different locations (e.g., different cubes). The corresponding permittivity or relative permittivity at each location of the the geographic area can be determined to be permittivity or relative permittivity of the dominant material, for example, by referring to Table 1.

Figure 14:
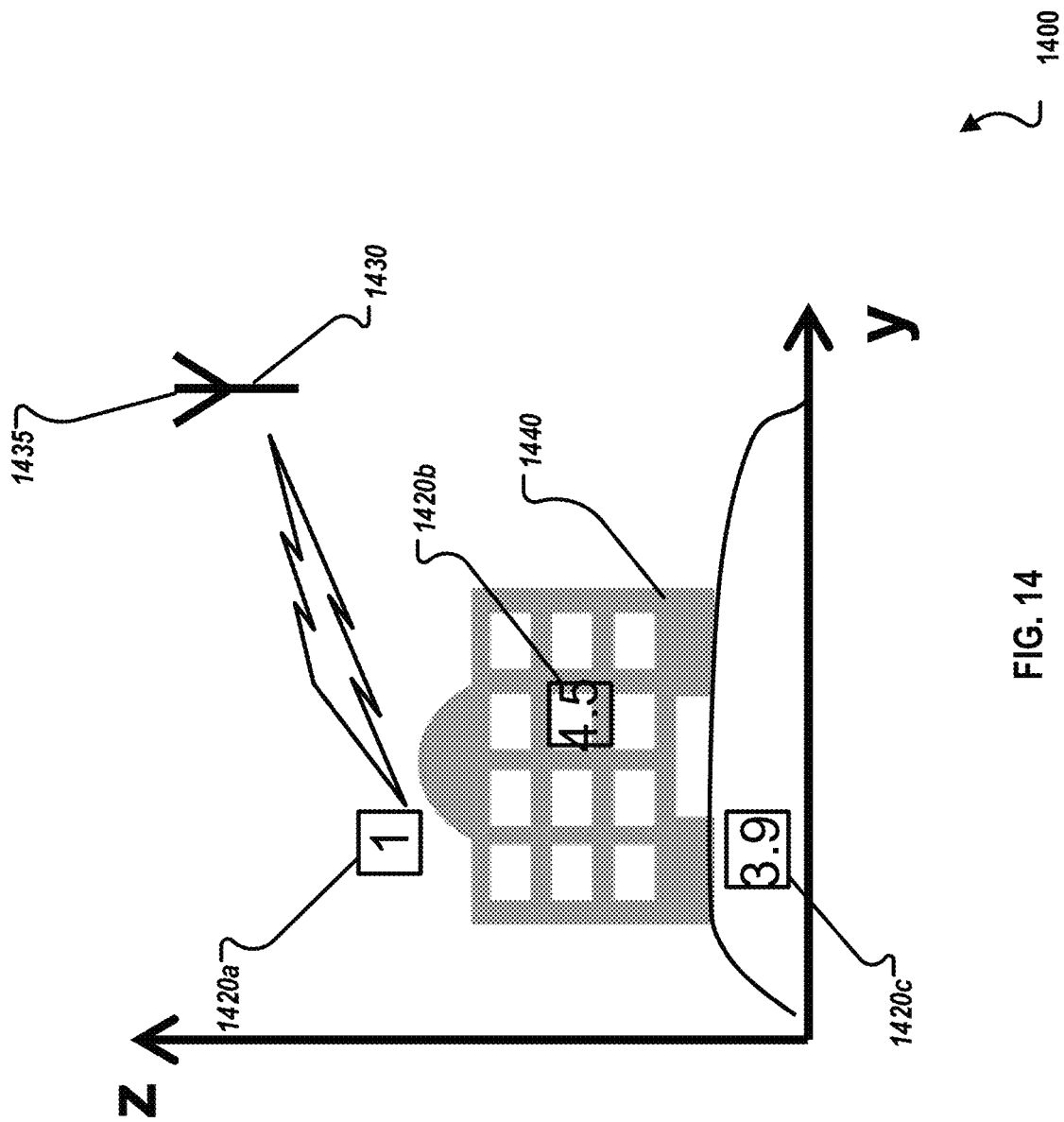
FIG. 14 is a schematic diagram illustrating example permittivities at different locations in a geographic area, according to an implementation.

FIG. 14 is a schematic diagram illustrating example permittivities at different locations in a geographic area 1400, according to an implementation. The geographic area 1400 can be a terrestrial area (e.g., an urban or rural area) that includes a base station 1430 that has one or more antennas 1435. Similar to FIG. 10, in some implementations, space surrounding the base station 1430 in the geographic area 1400 can be discretized into multiple cubes 1420a, 1420b, and 1420c (e.g., collectively cubes 1420). The locations of the cubes 1420 can be represented, for example, by corresponding geographic coordinates (e.g., x, y, and z) of the center of each cube 1420 in the space. For simplicity, FIG. 14 only shows in cubes in 2D. In some implementations, the permittivity tensor can include multiple cubes with corresponding permittivities, each represented by (x, y, z, $\varepsilon_r$). The permittivity can be the relative permittivity of a dominant material in each of the cubes. As illustrated in FIG. 14, the cube 1420a represents a location with a dominant material of air and thus has a relative permittivity of 1. The cube 1420b represents a location in a building 1440 with a dominant material of concrete and thus has a relative permittivity of 4.5. The cube 1420b represents a location in the earth with a dominant material of silicon dioxide and thus has a relative permittivity of 3.9.

A user equipment (UE) location tensor (or a UE existence tensor) can include UE existence indicators (e.g., with binary or Boolean values), each UE existence indicator indicating whether a UE can possibly exist at each of different locations in a geographic area. In other words, the UE location tensor can indicate whether a signal strength can potentially be measured at different locations in the 3D space of the geographic area.

Similarly, the different locations can be represented by different cubes (e.g., cubes 1020 in the space of the geographic area 1000 in FIG. 10), bins, grids, or other elements. As such, the UE location tensor can include multiple UE existence indicators of the multiple cubes in the geographic area. For example, if a UE can potentially be in a certain cube (representing a certain location) in the geographic area, the value of the UE existence indicator can be set to 1; otherwise, the value can be set to 0.

In some implementations, the UE location tensor can be used to include constraints, such as, physical constrains of the environments or the system, or design constraints of a user. For example, given the signal strength will not be measured below a terrain surface (under the ground), the UE existence indicators of the cubes that are on and above the terrain surface can be set to 1, and the UE existence indicators of the cubes that are below the terrain surface can be set to 0. As another example, if the user is only interested in the signal strength along the surface of the terrain (representing the use case where a person is walking around on the land), the UE existence indicators of the cubes that are on the terrain surface be 1 and the UE existence indicators of other cubes of the UE location tensor can be set to 0. In some implementations, the UE location tensor can be a sparse tensor with multiple 0. The UE location tensor can be used to reduce the computational complexity by filtering out cubes that are not of interests.

FIG. 15 is a schematic diagram illustrating example UE existence indicators of a UE location tensor at different locations in a geographic area 1500, according to an implementation. The geographic area 1500 can be a terrestrial area (e.g., an urban or rural area) that includes a base station 1530 that has one or more antennas 1535. Similar to FIG. 10, in some implementations, space surrounding the base station 1530 in the geographic area 1500 can be discretized into multiple cubes 1520a, 1520b, and 1520c (e.g., collectively cubes 1520). The locations of the cubes 1520 can be represented, for example, by corresponding geographic coordinates (e.g., x, y, and z) of the center of each cube 1520 in the space. For simplicity, FIG. 15 only shows in cubes in 2D. In some implementations, the UE location tensor can include multiple cubes with respective UE existence indicators, each represented by (x, y, z, i). The UE existence indicators can have binary values, such as 0 or 1. As illustrated in FIG. 15, the cube 1520a represents a location above a building 1540 in the air where a UE is unlikely to be located. As such, the UE existence indicator of the cube 1520a has a value of 0. The cube 1520b represents a location on the ground where a UE is likely to be located. As such, the UE existence indicator of the cube 1520b has a value of 1. The cube 1520c represents a location underneath the ground where a UE is unlikely to be located. As such, the UE existence indicator of the cube 1520c has a value of 0.

Referring back to FIG. 5, at 503, the one or more processors input the geographic data and the antenna and transmit power information into the convolutional neural network. For example, the one or more processors use a multi-dimensional tensor (e.g., the above-described 4D tensor that includes five channels of 3D tensors) based on the geographic data (and the antenna and power information of the base station into as the input to the convolutional neural network. The convolutional neural network can be a trained convolutional neural network that receives the geographic data and the antenna and transmit power information as inputs and returns received signal strength as outputs.

At 504, the one or more processors predict received signal strength using the convolutional neural network that includes the number of of convolution layers based on the received geographic data and the antenna and power information of the base station in the geographic area. In some implementations, predicting the received signal strength based on the received geographic data and the antenna and transmit power information includes predicting the received signal strength based on the multi-dimensional tensor that includes the geographic data and the antenna and power information of the base station.

The predicted received signal strength represents signal strength of wireless signals received at different locations in the geographic area. For example, the predicted received signal strength can represent signal strength of wireless signals transmitted from a base station and received by one or more user equipments (UEs) at different possible locations in the geographic area. A UE may include a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data, via a wireless communication network. A base station can be a NodeB, an evolved NodeB (eNB), a next generation (e.g., 5G) NodeB, or an access point.

At 506, the one or more processors output the predicted received signal strength. The predicted received signal strength can be in the form of a received signal strength matrix (e.g., the received signal strength matrix 130, 230, or 306), a table, a plot, or any other data structure or representation.

At 508, the one or more processors perform an automatic site planning of the geographic area based on the predicted received signal strength representing signal strength of wireless signals received at different locations in the geographic area. For example, the one or more processors can calculate path loss values corresponding to the predicted received signal strength. The predicted path loss values can represent propagation attenuation of the wireless signals at the different locations in the geographic area. Automatic site planning can include, for example, improving, optimizing, or otherwise adjusting antenna configurations (e.g., the antenna locations, antenna beam directions, transmitting power, and in some cases antenna radiation pattern) or other parameters of a base station in the geographic area based on the predicted received signal strength. As such, a mobile service provider can achieve, for example, better coverage over a certain region in the geographic area, less interference between sites, and lower cost of equipment. In some implementations, a number of candidate (or hypothetical) antenna configurations can be used for predicting received signal strength. With each of the different candidate antenna configurations, received signal strength representing signal strength of wireless signals received at different locations in the geographic area corresponding to the each of the candidate antenna configuration can be predicted, for example, according to the method 500. The antenna configuration gives the most desirable performance (e.g., the largest sum or average, or the smallest variation) of the predicted signal strength at at different locations in the geographic area can be selected. In some implementations, the predicted received signal strength at different locations in the geographic area can serve as a performance indicator for each antenna configuration.

Figure 6:
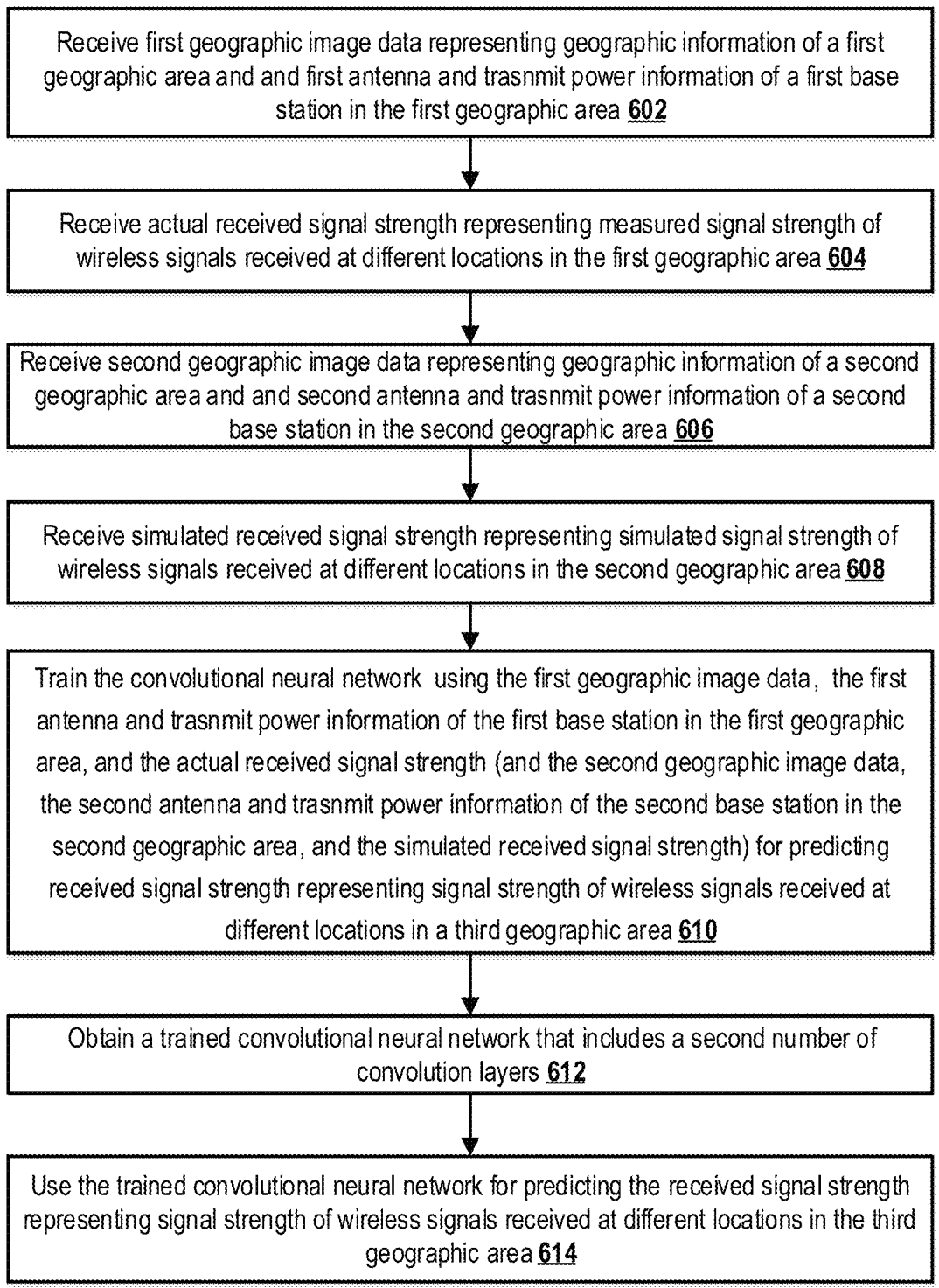
FIG. 6 is a flowchart illustrating an example method for obtaining a trained deep neural network for predicting received signal strength in a telecommunication network, according to an implementation.

FIG. 6 is a flowchart illustrating an example method 600 for obtaining a trained deep neural network for predicting received signal strength in a telecommunication network, according to an implementation. The method 600 can be implemented by one or more processors that execute a convolutional neural network that includes a first number of convolution layers. The convolutional neural network can be an initial convolutional neural network to be trained, fine-tuned, or otherwise modified. The convolutional neural network can be a predetermined, default convolutional neural network, or another convolutional neural network that has known parameters and structure.

The one or more processors can be within a single computing device or distributed among multiple computing devices or cloud. In some implementations, the one or more processors can be a processor 705 shown in FIG. 7.

The method 600 can also be implemented using additional, fewer, or different entities. Furthermore, the method 600 can also be implemented using additional, fewer, or different operations, which can be performed in the order shown or in a different order. In some instances, an operation or a group of operations can be iterated or repeated, for example, for a specified number of iterations or until a terminating condition is reached.

The example method 600 begins at 602, where the one or more processors receive first geographic data (e.g., the GIS map patches 302) representing geographic information of a first geographic area. In some implementations, the one or more processors further receive antenna and power information of a first base station in the first geographic area. In some implementations, a multi-dimensional tensor (e.g., a 4-dimensional tensor) can be determined based on the geographic data and the antenna and power information of the first base station. The multi-dimensional tensor can serve as an input into the convolutional neural network, alleviating the learning tasks of the convolutional neural network during training. In some implementations, data received by the one or more processors can include data received from a user interface or a communication interface, retrieved from a memory, database, or another data storage device, or otherwise obtained from one or more other sources.

At 604, the one or more processors receive actual received signal strength (e.g., field received signal strength data 406) representing representing measured signal strength of wireless signals received at different locations in the first geographic area. In some implementations, receiving actual received signal strength includes receiving the actual received signal strength based on a road test that measures received signal strength representing signal strength of wireless signals received at different locations in the first geographic area. In some implementations, receiving actual received signal strength includes receiving the actual received signal strength from a usage or service report that records signal strength received by one or more UEs at different locations in the first geographic area. In some implementations, the actual received signal strength can be obtained from other sources using other methods.

At 606, the one or more processors receive second geographic data (e.g., the GIS map patches 402) representing geographic information of a second geographic area. The second geographic area can be the same as or different from the first geographic area. In some implementations, the one or more processors further receive antenna and power information of a second base station in the second geographic area. In some implementations, a multi-dimensional tensor (for example, a 4-dimensional tensor) can be determined based on the geographic data and the antenna and power information of the second base station. The multi-dimensional tensor can serve as an input into the convolutional neural network, alleviating the learning tasks of the convolutional neural network during training.

At 608, the one or more processors receive simulated received signal strength (e.g., the received signal strength matrices 306) representing simulated signal strength of wireless signals received at different locations in the second geographic area. For example, the simulated received signal strength is obtained based on the first geographic data. In some implementations, receiving the simulated received signal strength includes receiving the simulated received signal strength from a simulator that estimates received signal strength representing signal strength of wireless signals received at different locations in the second geographic area based on the second geographic data. The simulator can be, for example, a commercial received signal strength simulator such as VOLCANO simulator 305, or any other simulators that implement one or more of a statistical method, a deterministic method, or a combination of these and other methods for received signal strength prediction. In some implementations, the simulated received signal strength can be obtained from other sources using other methods.

At 610, the one or more processors train the convolutional neural network using the first geographic data and the actual received signal strength for predicting received signal strength representing signal strength of wireless signals received at different locations in a third geographic area. In some implementations, training the convolutional neural network can include adjusting the parameters of the convolutional neural network according to a certain metric, such as minimum mean square error. In some implementations, the convolutional neural network can be trained using a supervised learning algorithm according to the example techniques described with respect to FIG. 3 or FIG. 4.

In some implementations, training the convolutional neural network using the first geographic data and the actual received signal strength includes training the convolutional neural network using the first geographic data, the first antenna and transmit power information of the first base station in the first geographic area, and the actual received signal strength. In some implementations, training the convolutional neural network using the first geographic data and the actual received signal strength includes training the convolutional neural network using the first geographic data and the actual received signal strength, and the second geographic data and the simulated received signal strength. In some implementations, training the convolutional neural network using the first geographic data and the actual received signal strength includes training the convolutional neural network using the first geographic data, the first antenna and transmit power information of the first base station in the first geographic area, and the actual received signal strength, the second antenna and transmit power information of a second base station in the second geographic area, and the second geographic data and the simulated received signal strength. For example, training the convolutional neural network includes obtaining a first trained convolutional neural network (e.g., the ConvNet-VOLCANO 308) by training the convolutional neural network based on the second geographic data, the second antenna and transmit power information of a second base station in the second geographic area, and the simulated received signal strength representing simulated signal strength of wireless signals received at different locations in the second geographic area; and fine tuning the first convolutional neural network based on the first geographic data, the first antenna and transmit power information of the first base station in the first geographic area, and the actual received signal strength representing measured signal strength of wireless signals received at different locations in the first geographic area. In some implementations, fine tuning a convolutional neural network can be an example of training a convolutional neural network with small adjustments (for example, by limiting the number of the parameters of the convolutional neural network to be adjusted or limiting a learning rate or a step of an adjustment made to each or some of the parameters of the convolutional neural network).

At 612, the one or more processors obtain a trained convolutional neural network (e.g., the ConvNet-Real 408) that includes a second number of convolution layers. In some implementations, the trained convolutional neural network and the first trained convolutional neural network can differ in one or more of the numbers, structure, or parameters of convolution layers. For example, the trained convolutional neural network and the first trained convolutional neural network can have the same numbers and structure of convolution layers but different values of the parameters of the convolution layers.

The trained convolutional neural network, as an output of the example method 600, has a cross-layer structure in that received signal strength output from the trained convolutional neural network are obtained by combining outputs of two or more layers at different depths of the trained convolutional neural network.

At 614, the one or more processors uses the trained convolutional neural network for predicting received signal strength representing signal strength of wireless signals received at different locations in the third geographic area, for example, according to the example techniques described with respect to FIG. 5. For example, the one or more processors can receive third geographic data representing geographic information of the third geographic area. The one or more processors can input the third geographic data into the trained convolutional neural network, execute the trained convolutional neural network using the input third geographic data, and obtain, as the predicted received signal strength of the third geographic data, an output of the trained convolutional neural network in response to the input third geographic data.

Figure 7:
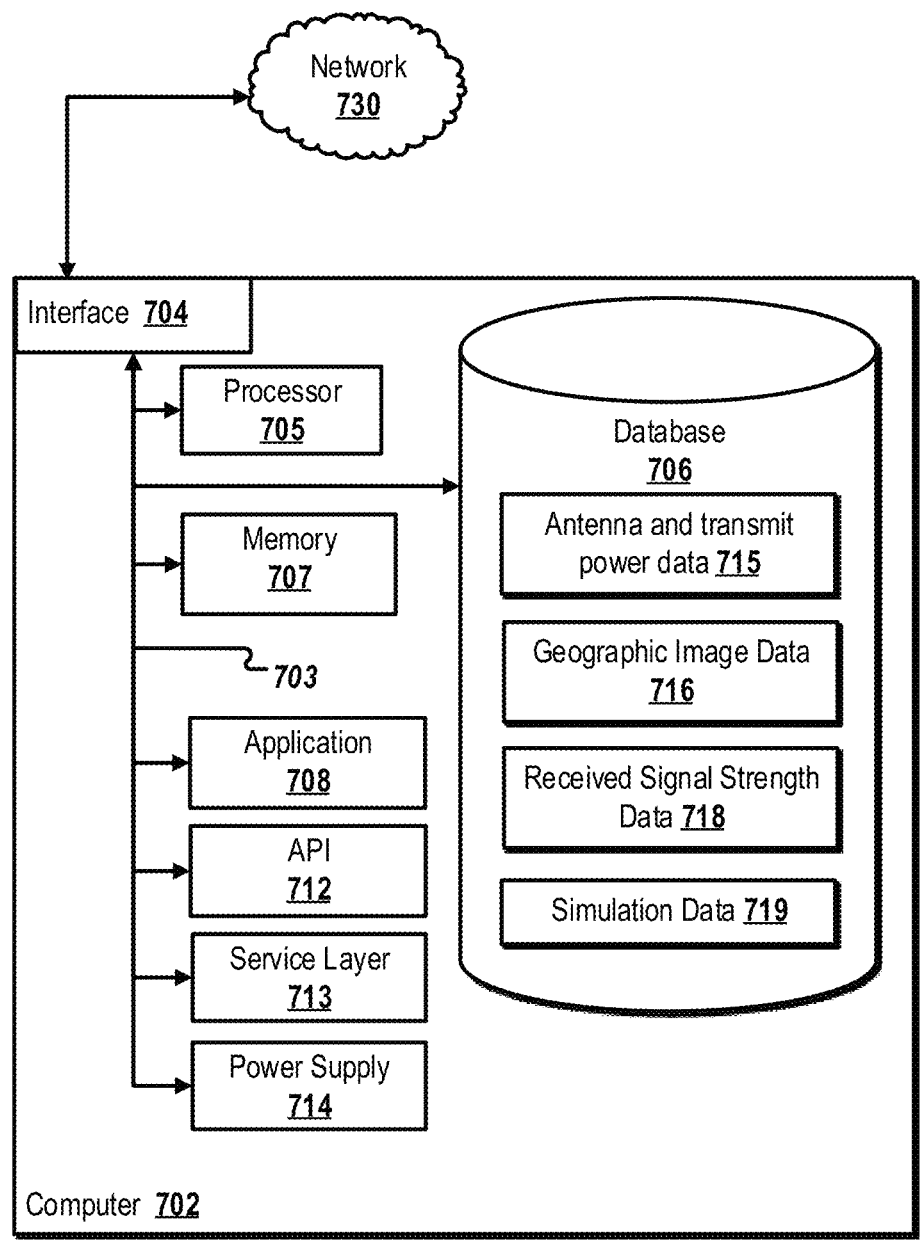
FIG. 7 is a block diagram of an example computer system used to provide computational functionalities associated with described algorithms, methods, functions, processes, flows, and procedures, as described in the present disclosure, according to an implementation.

FIG. 7 is a block diagram of an example computer system 700 used to provide computational functionalities associated with described algorithms, methods, functions, processes, flows, and procedures, as described in the instant disclosure, according to an implementation. The computer system 700, or more than one computer system 700, can be used to implement the example methods described previously in this disclosure. For example, the computer system 700, or more than one computer system 700, can also be used to predict received signal strength in a telecommunication network using a deep neural network described previously in this disclosure.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may include a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, that execute on another computer 702) and respond to the received requests by processing the received requests using an appropriate software application(s). In addition, requests may also be sent to the computer 702 from internal users (for example, from a command console or by other appropriate access methods), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 includes logic encoded in software or hardware (or a combination of software and hardware) and is operable to communicate with the network 730. More specifically, the interface 704 may include software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702. In some implementations, the database 706 can include geographic data 716 representing geographic information of a geographic area, antenna and transmit power data 715 representing antenna and transmit power information of a base station in the geographic area, and received signal strength data 718 representing signal strength of wireless signals received at different locations in the geographic area. In some implementations, the database 706 can include simulation data 719 generated by a simulation program executed by the processor 705. For example, the simulation data 719 can include simulated received signal strength data representing signal strength of wireless signals received at different locations in the geographic area.

The computer 702 also includes a memory 707 that can hold data for the computer 702 or other components (or a combination of both) that can be connected to the network 730 (whether illustrated or not). For example, memory 707 can be random access memory (RAM), read-only memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Figure 8:
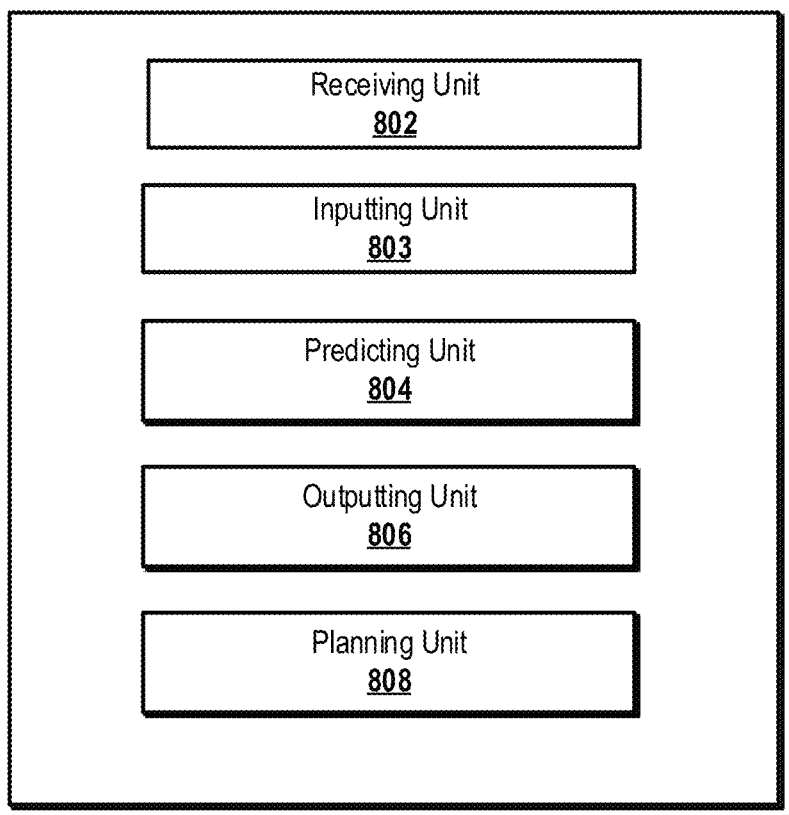
FIG. 8 is a schematic diagram illustrating an example structure of a data processing apparatus described in the present disclosure, according to an implementation.

FIG. 8 is a schematic diagram illustrating an example structure of a data processing apparatus 800 described in the present disclosure, according to an implementation. The data processing apparatus 800 can be used to predict received signal strength using a deep neural network. The data processing apparatus 800 can be one or more processors that execute a convolutional neural network. The data processing apparatus 800 includes a receiving unit 802, a predicting unit 804, an outputting unit 806, and a planning unit 808. Each of the units can be implemented by one or more processors (e.g., the processor 705) interoperably coupled with one or more computer memory devices (e.g., the memory 707) to perform the described functions. In some implementations, each of the units can be implemented as an individual module. In some implementations, some or all of the units could be integrated into a single module. In some implementations, each of the units can be implemented in software, hardware, an FPGA (field programmable gate array) or an ASIC (application-specific integrated circuit) implemented in hardware, an ASIC or FPGA, or a combination of these and other implementations.

The receiving unit 802 is configured to receive geographic data representing geographic information of a geographic area and and antenna and transmit power information of a base station in the geographic area, for example, according to the operations described with respect to 502 in FIG. 5. The inputting unit 803 is configured to input the geographic data and the antenna and transmit power information into the convolutional neural network, for example, according to the operations described with respect to 503 in FIG. 5. The predicting unit 804 is configured to predict received signal strength using the convolutional neural network that comprises a number of convolution layers based on the received geographic data and the antenna and transmit power information, for example, according to the operations described with respect to 504 in FIG. 5. The predicted received signal strength representing signal strength of wireless signals received at different locations in the geographic area. The outputting unit 806 is configured to output the predicted received signal strength, for example, via a user interface or a communication interface, to a display, a screen, a data store, or a remote device, for example, according to the operations described with respect to 506 in FIG. 5. The planning unit 808 is configured to perform a site planning of the geographic area based on the predicted received signal strength representing signal strength of wireless signals received at different locations in the geographic area, for example, according to the operations described with respect to 508 in FIG. 5.

Figure 9:
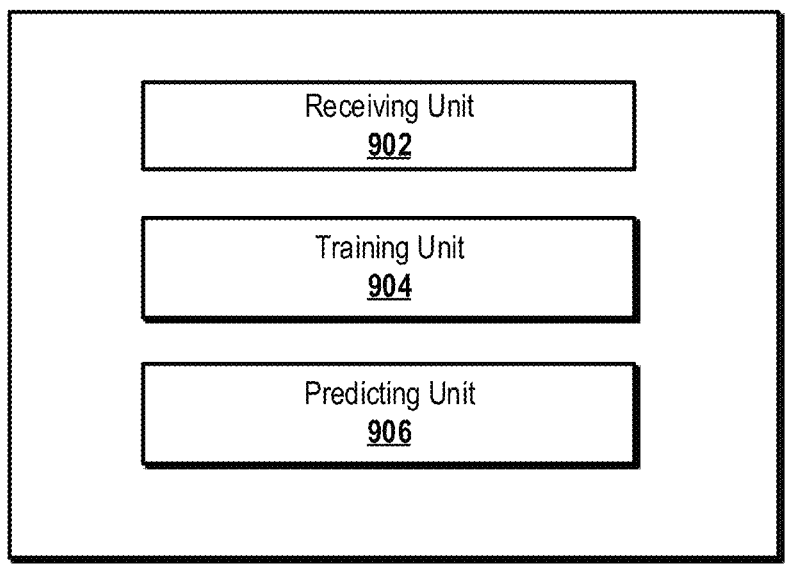
FIG. 9 is a schematic diagram illustrating an example structure of another data processing apparatus described in the present disclosure, according to an implementation.

FIG. 9 is a schematic diagram illustrating an example structure of another data processing apparatus 900 described in the present disclosure, according to an implementation. The data processing apparatus 900 can be used to obtain a trained deep neural network for predicting received signal strength, for example, in a telecommunication network. The data processing apparatus 900 can be one or more processors that execute a convolutional neural network. The data processing apparatus 900 includes a receiving unit 902, a training unit 904, and a predicting unit 906. Each of the units can be implemented by one or more processors (e.g., the processor 705) interoperably coupled with one or more computer memory devices (e.g., the memory 707) to perform the described functions. In some implementations, each of the units can be implemented as an individual module. In some implementations, some or all of the units could be integrated into a single module. In some implementations, each of the units can be implemented in software, hardware, an FPGA (field programmable gate array) or an ASIC (application-specific integrated circuit) implemented in hardware, an ASIC or FPGA, or a combination of these and other implementations.

The receiving unit 902 is configured to receive first geographic data representing geographic information of a first geographic area, first antenna and transmit power information of a first base station in the first geographic area, and actual received signal strength representing measured signal strength of wireless signals received at different locations in the first geographic area, for example, according to the operations described with respect to 602 and 604 in FIG. 6. The receiving unit 902 is further configured to receive second geographic data representing geographic information of a second geographic area, second antenna and transmit power information of a second base station in the second geographic area, and simulated received signal strength representing simulated signal strength of wireless signals received at different locations in the second geographic area, for example, according to the operations described with respect to 606 and 608 in FIG. 6.

The training unit 904 is configured to train the convolutional neural network, for predicting received signal strength representing signal strength of wireless signals received at different locations in a third geographic area, using the first geographic data, the first antenna and transmit power information of the first base station in the first geographic area, and the actual received signal strength, the second geographic data and the simulated received signal strength, or all of them. The training unit 904 is configured to train the convolutional neural network, for example, according to the operations described with respect to 610 in FIG. 6. The training unit 904 is configured to obtain a trained convolutional neural network that includes a second number of convolution layers, for example, according to the operations described with respect to 612 in FIG. 6.

The predicting unit 906 is configured to use the trained convolutional neural network for predicting received signal strength representing signal strength of wireless signals received at different locations in the third geographic area, for example, according to the operations described with respect to 614 in FIG. 6.

Described implementations of the subject matter can include one or more features, alone or in combination.

For example, in a first implementation, a computer-implemented method predicting received signal strength in a telecommunication network includes receiving, by one or more processors that execute a convolutional neural network, geographic data representing geographic information of a geographic area and antenna and transmit power information of a base station in the geographic area; inputting the geographic data and the antenna and transmit power information into the convolutional neural network; predicting received signal strength using the convolutional neural network that includes a number of convolution layers based on the received geographic data and the antenna and transmit power information, the received signal strength representing signal strength of wireless signals received at different locations in the geographic area; and outputting the predicted received signal strength.

In a second implementation, a non-transitory computer-readable media storing computer instructions for predicting received signal strength in a telecommunication network, that when executed by one or more processors, cause the one or more processors to perform the steps of: receiving, by one or more processors that execute a convolutional neural network, geographic data representing geographic information of a geographic area and antenna and transmit power information of a base station in the geographic area; inputting the geographic data and the antenna and transmit power information into the convolutional neural network; predicting received signal strength using the convolutional neural network that includes a number of convolution layers based on the received geographic data and the antenna and transmit power information, the received signal strength representing signal strength of wireless signals received at different locations in the geographic area; and outputting the predicted received signal strength.

In a third implementation, a received signal strength prediction device, including: a non-transitory memory storage including instructions; and one or more processors in communication with the memory, wherein the one or more processors execute a convolutional neural network that includes a number of convolution layers and execute the instructions to: receive geographic data representing geographic information of a geographic area and antenna and transmit power information of a base station in the geographic area; input the geographic data and the antenna and transmit power information into the convolutional neural network; predict received signal strength using the convolutional neural network that comprises a plurality of convolution layers based on the received geographic data and the antenna and transmit power information, the received signal strength representing signal strength of wireless signals received at different locations in the geographic area; and output the predicted received signal strength.

The foregoing and other described implementations can each, optionally, include one or more of the following features.

A first feature, combinable with any of the following features, wherein the convolutional neural network has a cross-layer structure in that the predicted received signal strength corresponding to the different locations of the geographic area are determined by combining outputs of two or more layers at different depths of the convolutional neural network.

A second feature, combinable with any of the previous or following features, wherein combining outputs of two or more layers at different depths of the convolutional neural network includes using the outputs of the two or more layers as input to one or more additional neural network layers to generate one or more outputs.

A third feature, combinable with any of the previous or following features, further including performing a site planning of the geographic area based on the predicted received signal strength.

A fourth feature, combinable with any of the previous or following features, wherein the geographic data includes geographic information system (GIS) data that includes one or more of a building height map layer, a terrain layer, or a clutter layer.

A fifth feature, combinable with any of the previous or following features, wherein wherein the geographic data includes one or more of a satellite picture or an aviation picture.

A sixth feature, combinable with any of the previous or following features, wherein the convolutional neural network is trained by using both simulated path loss data and actual path loss data.

A seventh feature, combinable with any of the previous or following features, wherein the antenna and transmit power information of the base station in the geographic area comprise free-space received signal strength representing free-space received signal strength of wireless signals received at different locations in the geographic area, wherein the free-space received signal strength the different locations in the geographic area are calculated based on a transmission power of the antenna, a radiation pattern of the antenna, and respective distances from the different locations in the geographic area to the antenna of the base station.

An eighth feature, combinable with any of the previous or following features, further including determining a multi-dimensional tensor based on the geographic data and the antenna and power information of the base station, wherein the multi-dimensional tensor comprises one or more of: a free-space received signal strength tensor, a horizontal line of sight angle tensor, a vertical line of sight angle tensor, a permittivity tensor, or a user equipment (UE) location tensor; and wherein predicting the received signal strength based on the received geographic data includes predicting the received signal strength based on the multi-dimensional tensor.

A ninth feature, combinable with any of the previous or following features, further including calculating path loss values corresponding to the predicted received signal strength, the predicted path loss values representing propagation attenuation of the wireless signals at the different locations in the geographic area.

In a fourth implementation, a computer-implemented method for training a convolutional neural network for predicting received signal strength in a telecommunication network, including: receiving, by one or more processors that execute a convolutional neural network that includes a first number of convolution layers, first geographic data representing geographic information of a first geographic area and first antenna and transmit power information of a first base station in the first geographic area; receiving, by the one or more processors that execute the convolutional neural network, actual received signal strength, the actual received signal strength representing measured signal strength of wireless signals received at different locations in the first geographic area; training, by the one or more processors that execute the convolutional neural network, the convolutional neural network using the first geographic data, the first antenna and transmit power information of the first base station in the first geographic area, and the actual received signal strength for predicting received signal strength representing signal strength of wireless signals received at different locations in a third geographic area; and obtaining, by the one or more processors that execute the convolutional neural network, a trained convolutional neural network that includes a second number of convolution layers.

In a fifth implementation, a non-transitory computer-readable media storing computer instructions for training a convolutional neural network for predicting received signal strength in a telecommunication network, that when executed by one or more processors, cause the one or more processors to perform the steps of: receiving, by one or more processors that execute a convolutional neural network that includes a first number of convolution layers, first geographic data representing geographic information of a first geographic area and first antenna and transmit power information of a first base station in the first geographic area; receiving, by the one or more processors that execute the convolutional neural network, actual received signal strength, the actual received signal strength representing measured signal strength of wireless signals received at different locations in the first geographic area; training, by the one or more processors that execute the convolutional neural network, the convolutional neural network using the first geographic data, the first antenna and transmit power information of the first base station in the first geographic area, and the actual received signal strength for predicting received signal strength representing signal strength of wireless signals received at different locations in a third geographic area; and obtaining, by the one or more processors that execute the convolutional neural network, a trained convolutional neural network that includes a second number of convolution layers.

In a sixth implementation, a device for training a convolutional neural network for predicting received signal strength in a telecommunication network, including: a non-transitory memory storage including instructions; and one or more processors in communication with the memory, wherein the one or more processors execute the instructions to: receive, by one or more processors that execute a convolutional neural network that includes a first number of convolution layers, first geographic data representing geographic information of a first geographic area and first antenna and transmit power information of a first base station in the first geographic area; receive, by the one or more processors that execute the convolutional neural network, actual received signal strength, the actual received signal strength representing measured signal strength of wireless signals received at different locations in the first geographic area; train, by the one or more processors that execute the convolutional neural network, the convolutional neural network using the first geographic data, the first antenna and transmit power information of the first base station in the first geographic area, and the actual received signal strength for predicting received signal strength representing signal strength of wireless signals received at different locations in a third geographic area; and obtain, by the one or more processors that execute the convolutional neural network, a trained convolutional neural network that includes a second number of convolution layers.

The foregoing and other described implementations can each, optionally, include one or more of the following features.

A first feature, combinable with any of the following features, further including: receiving, by the one or more processors that execute the convolutional neural network, second geographic data representing geographic information of a second geographic area and second antenna and transmit power information of a second base station in the second geographic area; receiving, by the one or more processors that execute the convolutional neural network, simulated received signal strength, the simulated received signal strength representing simulated signal strength of wireless signals received at different locations in the second geographic area; and wherein training the convolutional neural network using the first geographic data, the first antenna and transmit power information of the first base station in the first geographic area, and the actual received signal strength includes training the convolutional neural network using the first geographic data and the actual received signal strength, and the second geographic data, the second antenna and transmit power information of a second base station in the second geographic area, and the simulated received signal strength.

A second feature, combinable with any of the previous or following features, wherein receiving the simulated received signal strength includes receiving the simulated received signal strength from a simulator that estimates received signal strength representing signal strength of wireless signals received at different locations in the second geographic area.

A third feature, combinable with any of the previous or following features, wherein training the convolutional neural network includes: obtaining a first trained convolutional neural network by training the convolutional neural network based on the second geographic data, the second antenna and transmit power information of a second base station in the second geographic area, and the simulated received signal strength; and fine tuning the first convolutional neural network based on the first geographic data, the first antenna and transmit power information of the first base station in the first geographic area, and the actual received signal strength.

A fourth feature, combinable with any of the previous or following features, wherein receiving actual received signal strength includes receiving the actual received signal strength based on a road test that measures received signal strength representing signal strength of wireless signals received at different locations in the first geographic area.

A fifth feature, combinable with any of the previous or following features, wherein the trained convolutional neural network has a cross-layer structure in that received signal strength output from the trained convolutional neural network are obtained by combining outputs of two or more layers at different depths of the trained convolutional neural network.

A sixth feature, combinable with any of the previous or following features, further including using the trained convolutional neural network for predicting the received signal strength representing signal strength of wireless signals received at different locations in the third geographic area.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers that execute one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The elements of a computer include a CPU, for performing or that execute instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media, and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/− R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a number of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method for predicting received signal strength in a telecommunication network, comprising:
    receiving, by one or more processors that execute a convolutional neural network, geographic data representing geographic information of a geographic area and antenna and transmit power information of a base station in the geographic area;
    inputting, by the one or more processors that execute the convolutional neural network, the geographic data and the antenna and transmit power information into the convolutional neural network;
    predicting, by the one or more processors that execute the convolutional neural network, received signal strength using the convolutional neural network that comprises a plurality of convolution layers based on the geographic data and the antenna and transmit power information, the received signal strength representing signal strength of wireless signals received at different locations in the geographic area, wherein the convolutional neural network has a cross-layer structure in that the predicted received signal strength corresponding to the different locations of the geographic area are determined by combining outputs of two or more layers at different depths of the convolutional neural network; and
    outputting, by the one or more processors that execute the convolutional neural network, the predicted received signal strength.

2. The method of claim 1, wherein combining outputs of two or more layers at different depths of the convolutional neural network comprises using the outputs of the two or more layers as input to one or more additional neural network layers to generate one or more outputs.

3. The method of claim 1, further comprising performing a site planning of the geographic area based on the predicted received signal strength.

4. The method of claim 1, wherein the geographic data comprises geographic information system (GIS) data that comprises one or more of a building height map layer, a terrain layer, or a clutter layer.

5. The method of claim 1, wherein the geographic data comprises one or more of a satellite picture or an aviation picture.

6. The method of claim 1, wherein the convolutional neural network is trained by using both simulated path loss data and actual path loss data.

7. The method of claim 1, wherein the antenna and transmit power information of the base station in the geographic area comprise free-space received signal strength representing free-space received signal strength of wireless signals received at different locations in the geographic area, wherein the free-space received signal strength the different locations in the geographic area are calculated based on a transmission power of the antenna, a radiation pattern of the antenna, and respective distances from the different locations in the geographic area to the antenna of the base station.

8. The method of claim 1, further comprising:
determining a multi-dimensional tensor based on the geographic data and the antenna and power information of the base station, wherein the multi-dimensional tensor comprises one or more of: a free-space received signal strength tensor, a horizontal line of sight angle tensor, a vertical line of sight angle tensor, a permittivity tensor, or a user equipment (UE) location tensor; and
wherein predicting the received signal strength based on the geographic data comprises predicting the received signal strength based on the multi-dimensional tensor.

9. The method of claim 1, further comprising calculating path loss values corresponding to the predicted received signal strength, the predicted path loss values representing propagation attenuation of the wireless signals at the different locations in the geographic area.

10. A computer-implemented method for training a convolutional neural network for predicting received signal strength in a telecommunication network, comprising:
receiving, by one or more processors that execute a convolutional neural network that comprises a first plurality of convolution layers, first geographic data representing geographic information of a first geographic area and first antenna and transmit power information of a first base station in the first geographic area;
receiving, by the one or more processors that execute the convolutional neural network, actual received signal strength, the actual received signal strength representing measured signal strength of wireless signals received at different locations in the first geographic area;
training, by the one or more processors that execute the convolutional neural network, the convolutional neural network using the first geographic data, the first antenna and transmit power information of a first base station in the first geographic area, and the actual received signal strength for predicting received signal strength representing signal strength of wireless signals received at different locations in a third geographic area; and
obtaining, by the one or more processors that execute the convolutional neural network, a trained convolutional neural network that comprises a second plurality of convolution layers.

11. The method of claim 10, further comprising:
receiving, by the one or more processors that execute the convolutional neural network, second geographic data representing geographic information of a second geographic area and second antenna and transmit power information of a second base station in the second geographic area;
receiving, by the one or more processors that execute the convolutional neural network, simulated received signal strength, the simulated received signal strength representing simulated signal strength of wireless signals received at different locations in the second geographic area; and
wherein training the convolutional neural network using the first geographic data and the actual received signal strength comprises training the convolutional neural network using the first geographic data, the first antenna and transmit power information of a first base station in the first geographic area, and the actual received signal strength, and the second geographic data, the second antenna and transmit power information of a second base station in the second geographic area, and the simulated received signal strength.

12. The method of claim 11, wherein receiving the simulated received signal strength comprises receiving the simulated received signal strength from a simulator that estimates received signal strength representing signal strength of wireless signals received at different locations in the second geographic area.

13. The method of claim 11, wherein training the convolutional neural network comprises:
obtaining a first trained convolutional neural network by training the convolutional neural network based on the second geographic data, the second antenna and transmit power information of a second base station in the second geographic area, and the simulated received signal strength; and
fine tuning the first convolutional neural network based on the first geographic data, the first antenna and transmit power information of a first base station in the first geographic area, and the actual received signal strength.

14. The method of claim 10, wherein receiving actual received signal strength comprises receiving the actual received signal strength based on a road test that measures received signal strength representing signal strength of wireless signals received at different locations in the first geographic area.

15. The method of claim 10, wherein the trained convolutional neural network has a cross-layer structure in that received signal strength output from the trained convolutional neural network are obtained by combining outputs of two or more layers at different depths of the trained convolutional neural network.

16. The method of claim 10, further comprising using the trained convolutional neural network for predicting the received signal strength representing signal strength of wireless signals received at different locations in the third geographic area.

17. A non-transitory computer-readable medium storing computer instructions for predicting received signal strength in a telecommunication network, that when executed by one or more processors, cause the one or more processors to perform steps of:
receiving, by one or more processors that execute a convolutional neural network, geographic data representing geographic information of a geographic area and antenna and transmit power information of a base station in the geographic area;
inputting, by the one or more processors that execute the convolutional neural network, the geographic data and the antenna and transmit power information into the convolutional neural network;
predicting, by the one or more processors that execute the convolutional neural network, received signal strength using the convolutional neural network that comprises a plurality of convolution layers based on the geographic data, the received signal strength representing signal strength of wireless signals received at different locations in the geographic area, wherein the convolutional neural network has a cross-layer structure in that the predicted received signal strength corresponding to the different locations of the geographic area are determined by combining outputs of two or more layers at different depths of the convolutional neural network; and outputting, by the one or more processors that execute the convolutional neural network, the predicted received signal strength.

18. The non-transitory computer-readable medium of claim 17, the steps further comprising performing a site planning of the geographic area based on the predicted received signal strength.

19. The non-transitory computer-readable medium of claim 17, wherein combining outputs of two or more layers at different depths of the convolutional neural network comprises using the outputs of the two or more layers as input to one or more additional neural network layers to generate one or more outputs.

20. The non-transitory computer-readable medium of claim 17, wherein the geographic data comprises geographic information system (GIS) data that comprises one or more of a building height map layer, a terrain layer, or a clutter layer.

* * * * *